(12) United States Patent
Raymond et al.

(10) Patent No.: US 9,132,690 B2
(45) Date of Patent: Sep. 15, 2015

(54) PIXEL MAPPING, ARRANGING, AND IMAGING FOR ROUND AND SQUARE-BASED MICRO LENS ARRAYS TO ACHIEVE FULL VOLUME 3D AND MULTI-DIRECTIONAL MOTION

(71) Applicant: LUMENCO, LLC, Englewood, CO (US)

(72) Inventors: Mark A. Raymond, Littleton, CO (US); Hector Andres Porras Soto, Lakewood, CO (US)

(73) Assignee: LUMENCO, LLC, Englewood, CO (US)

( * ) Notice: Subject to any disclaimer, the term of this patent is extended or adjusted under 35 U.S.C. 154(b) by 20 days.

(21) Appl. No.: 14/017,415

(22) Filed: Sep. 4, 2013

(65) Prior Publication Data

US 2014/0063611 A1    Mar. 6, 2014

Related U.S. Application Data

(60) Provisional application No. 61/743,485, filed on Sep. 5, 2012.

(51) Int. Cl.
*G02B 27/08* (2006.01)
*B42D 15/00* (2006.01)
(Continued)

(52) U.S. Cl.
CPC . *B42D 15/00* (2013.01); *B41J 2/00* (2013.01); *B41M 3/14* (2013.01); *B42D 25/324* (2014.10); *B42D 25/342* (2014.10); *B44F 1/10* (2013.01); *G02B 27/2214* (2013.01); *G06F 3/12* (2013.01); *G09F 19/14* (2013.01)

(58) Field of Classification Search
CPC .... G02B 3/0056; G02B 3/0031; G02B 3/005; G02B 27/2214
USPC .................. 359/619, 463, 626; 382/159, 135; 347/134; 428/199
See application file for complete search history.

(56) References Cited

U.S. PATENT DOCUMENTS 6,424,467 B1    7/2002    Goggins
6,483,644 B1 *  11/2002    Gottfried et al. .............. 359/463
(Continued)

OTHER PUBLICATIONS

Search Report and Written Opinion from PCT/US2013/057926 mailed on Dec. 12, 2013.
(Continued)

*Primary Examiner* — Scott J Sugarman
*Assistant Examiner* — Kristina Deherrera
(74) *Attorney, Agent, or Firm* — Marsh Fischmann & Breyfogle LLP; Kent A. Lembke

(57) ABSTRACT

A visual display assembly adapted for use as an anti-counterfeiting device on paper currency, product labels, and other objects. The assembly includes a film of transparent material including a first surface including an array of lenses and a second surface opposite the first surface. The assembly also includes a printed image proximate to the second surface. The printed image includes pixels of frames of one or more images interlaced relative to two orthogonal axes. The lenses of the array are nested in a plurality of parallel rows, and adjacent ones of the lenses in columns of the array are aligned to be in a single one of the rows with no offset of lenses in adjacent columns/rows. The lenses may be round-based lenses or are square-based lenses, and the lenses may be provided at 200 lenses per inch (LPI) or a higher LPI in both directions.

9 Claims, 26 Drawing Sheets

(51) Int. Cl.
  *B41J 2/00* (2006.01)
  *B41M 3/14* (2006.01)
  *B44F 1/10* (2006.01)
  *G02B 27/22* (2006.01)
  *G09F 19/14* (2006.01)
  *B42D 25/324* (2014.01)
  *B42D 25/342* (2014.01)
  *G06F 3/12* (2006.01)

(56) References Cited

U.S. PATENT DOCUMENTS

| | | | |
|---|---|---|---|
| 7,068,434 B2 * | 6/2006 | Florczak et al. | 359/626 |
| 8,077,393 B2 | 12/2011 | Steenblik et al. | |
| 8,111,462 B2 | 2/2012 | Steenblik et al. | |
| 8,120,855 B2 | 2/2012 | Steenblik et al. | |
| 2003/0002160 A1 | 1/2003 | Johnson et al. | |
| 2007/0236500 A1 | 10/2007 | Choi et al. | |
| 2009/0034082 A1 * | 2/2009 | Commander et al. | 359/619 |
| 2011/0000967 A1 | 1/2011 | Labrec et al. | |
| 2011/0209328 A1 * | 9/2011 | Steenblik et al. | 29/428 |

OTHER PUBLICATIONS

Olsson, Synthesis, Coding, and Evaluation of 3D Images Based on Integral Imaging, Doctoral Thesis No. 55 Sundsvall. Sweden, 2008; retrieved from http://www.diva-portal.org/smash/get/diva2:1490/FULLTEXT01.pdf. See pp. 74, lines 14-15, 16-18, 26-27 and figure 4.2.

* cited by examiner

PIXEL MAPPING, ARRANGING, AND IMAGING FOR ROUND AND SQUARE-BASED MICRO LENS ARRAYS TO ACHIEVE FULL VOLUME 3D AND MULTI-DIRECTIONAL MOTION

CROSS-REFERENCE TO RELATED APPLICATIONS

This application claims the benefit of U.S. Provisional Application No. 61/743,485, filed Sep. 5, 2012, which is incorporated herein by reference in its entirety.

BACKGROUND

1. Field of the Description

The present invention relates, in general, to combining printed images with lens arrays to display three dimensional (3D) images with or without motion, and, more particularly, to a method of pixel mapping, providing arrangements of pixels, and imaging that is adapted for use with arrays of square or round-based micro lenses to provide enhanced 3D imagery with fuller volume and/or with multi-directional motion.

2. Relevant Background

There are presently many applications where it is desirable to view a printed image via an array of lenses. For example, anti-counterfeiting efforts often involve use of an anti-counterfeiting device or element that is made up of an array of lenses and an image printed onto the back of the lens array or onto an underlying substrate or surface (e.g., a sheet of paper or plastic). The anti-counterfeiting element may be used to display an image that is chosen to be unique and be an indicator that the item carrying the anti-counterfeiting element is not a counterfeit. The anti-counterfeiting market is rapidly growing worldwide with anti-counterfeiting elements placed on a wide range of items such as upon currency (e.g., on a surface of a paper bill to help prevent copying) and on labels for retail products (e.g., labels on clothing showing authenticity).

In this regard, moiré patterns have been used for years in anti-counterfeiting elements with arrays of round lenses and with arrays of hexagonal arrays (or round and hexagonal lens arrays). Typically, the printed images provided in an ink layer under these lens arrays are small, fine images relative to the size of the lenses. A moiré pattern is provided in the printed images in the form of a secondary and visually evident superimposed pattern that is created when two identical patterns on a surface are overlaid while being displaced or rotated a small amount from each other.

In such moiré pattern-based anti-counterfeiting elements, some of the images may be printed in a frequency slightly more or less frequent than the one-to-one dimension of the lenses in two axes, and some of the images may be printed slightly differently relative to each other. FIG. 1 illustrates an exemplary assembly 100 that may be used as an anti-counterfeiting element. The assembly 100 includes a lens array 110 made up of side-by-side, parallel columns (or rows) 112 of round lenses 114, and it can be seen that the columns 112 are offset from each other (by about 50 percent) such that pairs of adjacent lenses 114 in the columns are not aligned (e.g., a lens in a next column is positioned in the space between two lenses in the previous column).

A printed image 120 is provided in a layer of ink underneath the lens array 110 (on a back, planar surface of the lens array 110). The result, which is difficult to see in FIG. 1, is a moiré pattern that provides the illusion of depth of field to a viewer via the lenses 112 of the array 110 or, in some cases, the sense that the images are moving (motion or animation of the displayed items). Typically, the thickness of each of the lenses 112 is in the range of 0.5/1000 to 5/1000 inches (or 12 to about 125 microns), and the frequency of these lenses 112 in an array 110 is about 400×400 to over 1000×1000 per inch.

While helpful to reduce counterfeiting, use of moiré patterns with round lens arrays has not been wholly satisfactory for the anti-counterfeiting market. One reason is that the effects that can be achieved with moiré patterns are limited. For example, one cannot take a photograph and display 3D with a moiré pattern. Generally, the moiré patterns are used in the security and/or anti-counterfeiting industry in very fine lenses with focal lengths of about 20 to 75 microns and frequencies of over 500 lenses per inch in one axis or more than 250,000 lenses per square inch. As a result, the images underlying the lenses in the lens array are typically printed at least at 12,000 DPI (dots per inch) and may even be provided at over 25,000 DPI. These micro-lens arrays are generally closely nested as shown in element 200 with its array 210 in FIG. 2. The array 210 uses hexagonal lenses that are provided in offset and overlapping columns 212 (e.g., side-by-side lenses 214 are not aligned in a row and are positioned to fill or be nested into space between two lenses of adjacent columns 212) to focus on an image or moiré pattern 220 in an underlying ink layer.

One problem or issue with the use of such an array 210 and images 220 is that the element 200 is relatively easy to reverse engineer, which limits its usefulness as an anti-counterfeiting element. Particularly, the patterns 220 underlying the lenses 214 can be seen with an inexpensive and readily available microscope, which allows one to determine the frequency of the images and patterns. In addition, the lenses 214 can be cast and re-molded, which leaves printing the identified images as the only hurdle for successfully copying the element 200 (and then counterfeiting a piece of currency or a label for a product). Unfortunately, printing the image 220 is becoming easier to accomplish due to high resolution lasers and setters and other printing advances. Typically, for an element 200, the micro-lenses are printed using an emboss and fill technology, which limits the printing to one color due to the fact that the process tends to be self-contaminating after one color and also due to the fact that the process is difficult to control from a relative color-to-color pitch in the emboss-and-fill printing process.

Hence, there remains a need for advancements in the design and fabrication of assemblies or elements that combine a lens array with a printed image (layer of ink containing images/patterns) to display imagery. Such improvements may allow new anti-counterfeiting devices or elements to be produced for use with currency, labels, credit/debit cards, and other items, and these anti-counterfeiting devices preferably would be much more difficult if not nearly impossible to duplicate or copy. Further, there is a growing demand for such anti-counterfeiting devices to provide a surprising or "wow factor" with their displayed imagery such as images that float above and/or below a focal plane (e.g., more true 3D displays).

SUMMARY

Briefly, the inventors recognized that it may be beneficial to provide a different nesting of lenses in an array that can then be combined with an image having dual-axis interlacing. For example, the lenses may be circular or square-based lenses that have their centers aligned such that the array is made up of parallel rows and columns of lenses (e.g., without having adjacent lenses being offset from each other as seen in the arrays of FIGS. 1 and 2). The image is printed from a print file generated from a matrix of frames of images taken from a plurality of points of view (POVs) along both a first axis (X axis) and also along a second axis (Y axis). The frames are interlaced in both directions to provide a pixel mapping to the lenses of the array.

More particularly, a visual display assembly is provided that is useful as an anti-counterfeiting device on paper currency, product labels, and other objects. The assembly includes a film of transparent material including a first surface including an array of lenses and a second surface opposite the first surface. The assembly also includes a printed image proximate to the second surface. The printed image includes pixels of frames of one or more images interlaced relative to two orthogonal axes (printed from a file generated using dual-axis interlacing rather than single axis interlacing as in conventional lenticular printing). The lenses of the array are nested in a plurality of parallel rows, and adjacent ones of the lenses in columns of the array are aligned to be in a single one of the rows (e.g., no offsetting of adjacent lenses).

To provide the lens array, the lenses may be round-based lenses or are square-based lenses. The lenses of the array are provided at 200 LPI (or a higher LPI) as measured along both of the two orthogonal axes. The lenses may each have a focal length of less than 10/1000 inches. In some embodiments, the frames each include a different point of view (POV) of the one or more images. In such cases, the frames include images from at least three POVs along a first of the two orthogonal axes, and the frames further include images from at least two additional POVs corresponding to each of the three POVs along the second of the two orthogonal axes.

In the assembly, the printed image may be adapted such that an image displayed from a normal POV includes a first set of symbols and a second set of symbols, and, in an image displayed when the assembly is rotated from the normal POV about a first axis, the first and second sets of symbols move in opposite directions. Further, the printed image may be adapted such that in an image displayed, when the assembly is rotated from the normal POV about a second axis orthogonal to the first axis, the first and second symbols move in a single direction that is orthogonal to the second axis.

In other assemblies, the printed image can be adapted such that an image displayed from a normal POV includes a first set of symbols and a second set of symbols, and, in an image displayed when the assembly is rotated from the normal POV about a first axis, the first and second sets of symbols can move in a single direction that is parallel to the first axis of the assembly. In such embodiments of the assembly, the printed image is adapted such that in an image displayed when the assembly is rotated from the normal POV about a second axis orthogonal to the first axis, the first and second symbols move in a single direction that is parallel to the second axis.

Another visual effect is achieved in other embodiments of the assembly. Particularly, the printed image may include a wallpaper pattern (e.g., with icons, logos, and other symbols) and an overlay pattern. Then, the printed image may include mapped pixels such that the wallpaper pattern is visible from a plurality of POVs (when the assembly is rotated/tilted to differing angles relative to a viewer's line of sight), and the overlay pattern has a range of differing visibilities over the plurality of POVs. For example, the differing visibilities may include the overlay being invisible (or only faintly visible) to a viewer along a normal POV of the assembly while rotating or tilting the assembly away further and further from normal (in any direction in some cases) causes the darkness or brightness of the overlay pattern to increase until it is fully visible (or as dark or bright in color as it can be such as at some more extreme angle relative to normal such as an angle in the range of 45 to 60 degrees or the like).

DETAILED DESCRIPTION

Figure 1:
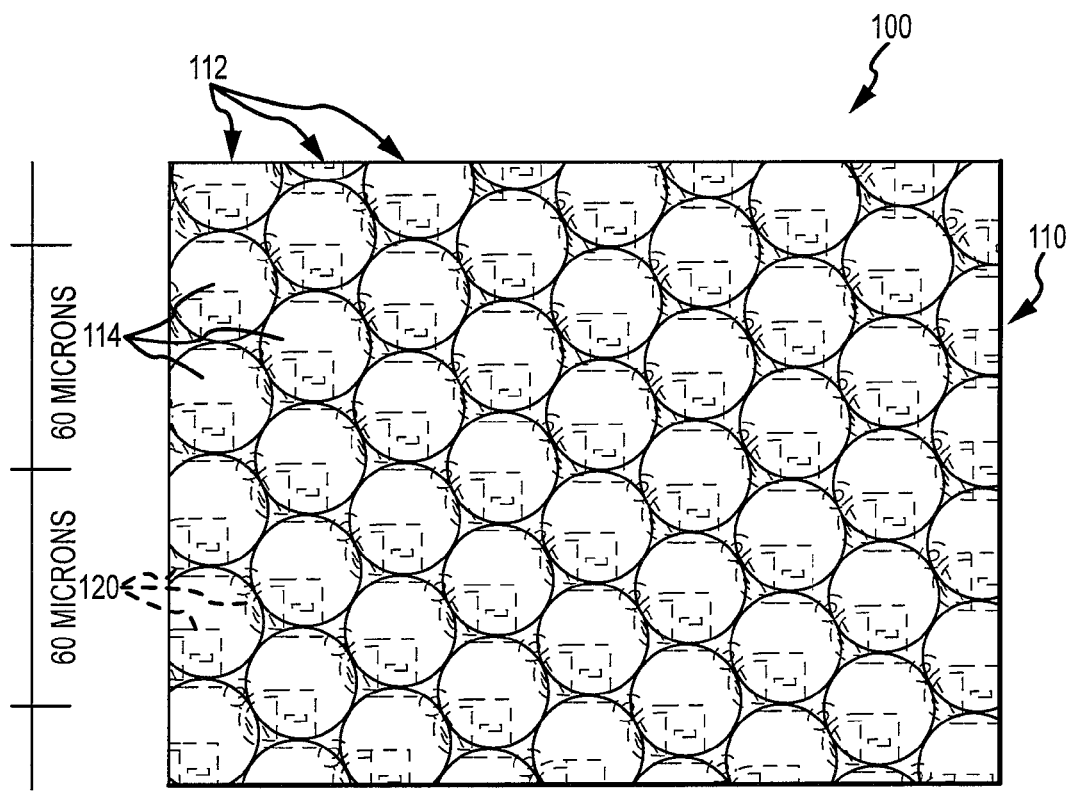
FIG. 1 is a top view of an assembly used as an anti-counterfeiting element or device with a lens array made up of side-by-side and vertically offset columns of round lenses (e.g., lenses are not arranged in linear rows in the array) overlying a printed moiré pattern.
Figure 2:
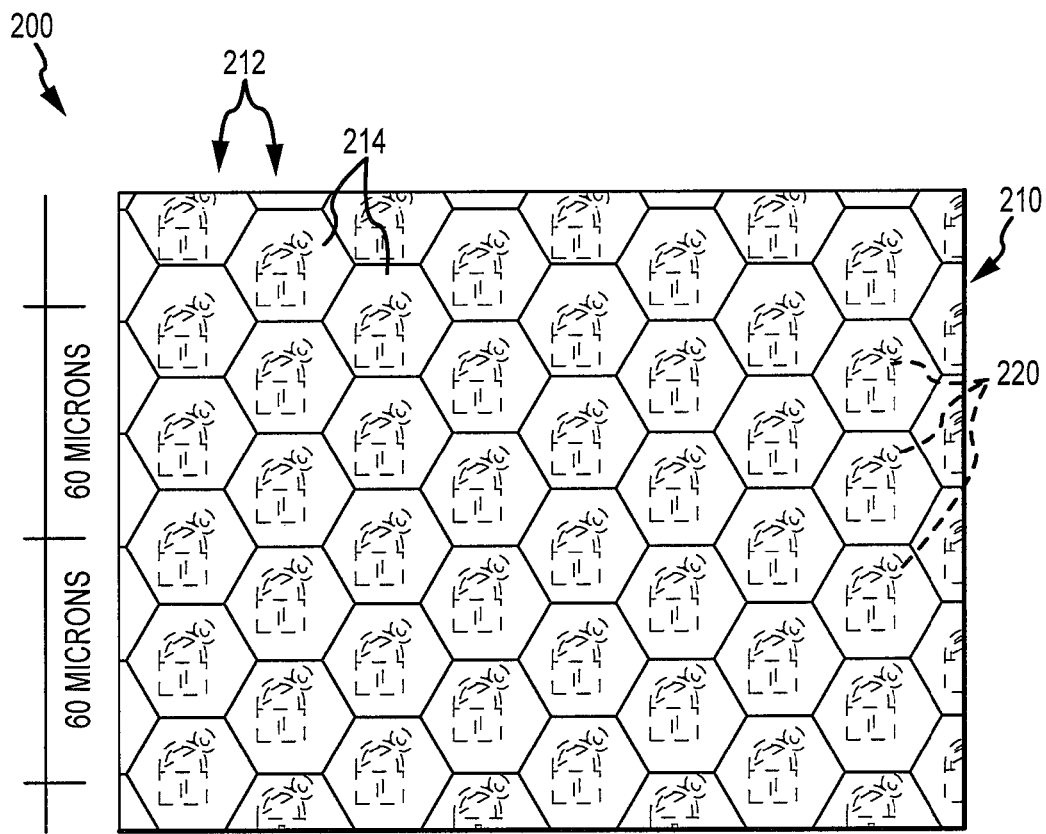
FIG. 2 is a top view, similar to that of FIG. 1, showing an assembly used as an anti-counterfeiting element or device with a lens array made up of side-by-side and vertically offset columns of hexagonal lenses (e.g., lenses not arranged in linear rows and tightly nested in abutting contact) overlying a printed moiré pattern.

Briefly, the present description is directed toward designs for assemblies of lens arrays combined with printed images provided in an ink layer. The assemblies can be used, for example but not as a limitation, as anti-counterfeiting elements or devices. The lens arrays differ from those shown in FIGS. 1 and 2, in part, because the lenses are arranged in columns that are not vertically offset such that the lenses are provided in parallel columns and also in parallel rows (e.g., pairs of adjacent lenses in side-by-side columns are aligned with their center axes being collinear). The lenses may be round or square-based, and the underlying image has its pixels mapped and arranged such that the micro lens arrays produce a 3D displayed image with full volume and, in some cases, with multi-directional motion or animation.

Figure 3A:
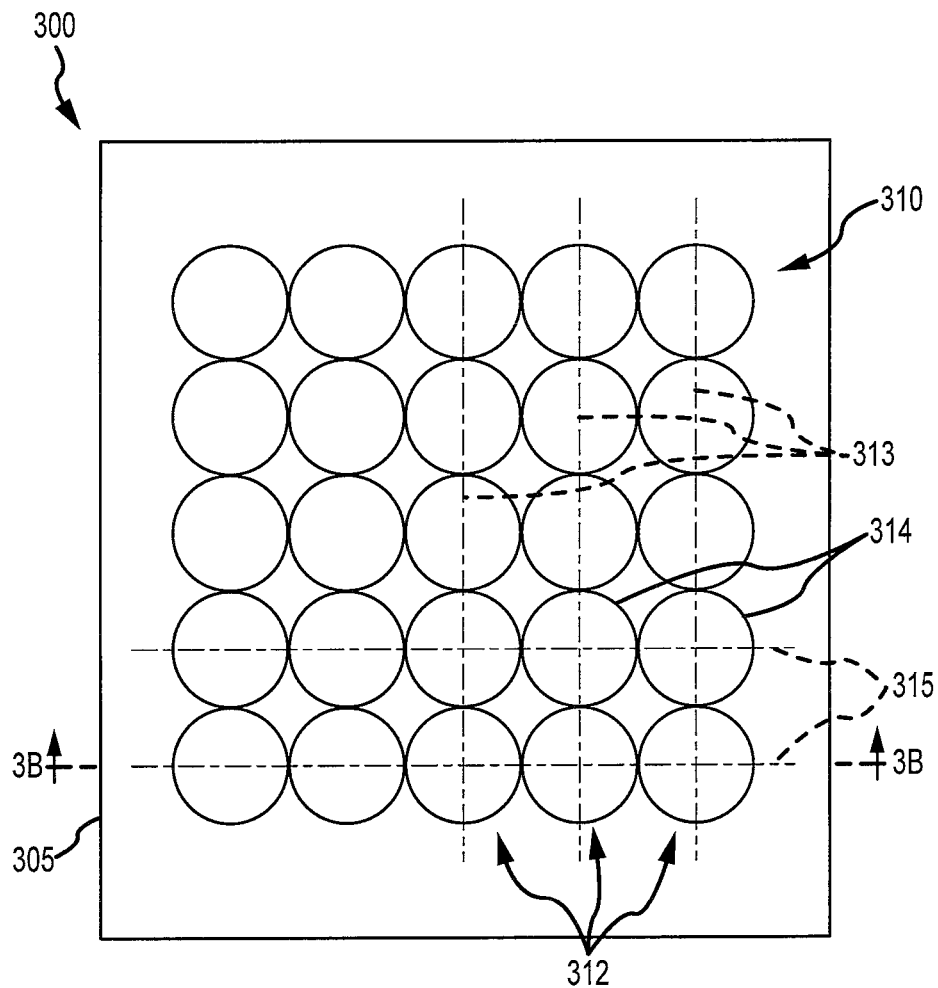
FIGS. 3A and 3B illustrate a top and sectional view taken at line 3B-3B, respectively, of an item such a piece of paper currency or a product label with an anti-counterfeiting device based on a round lens array.
Figure 3B:
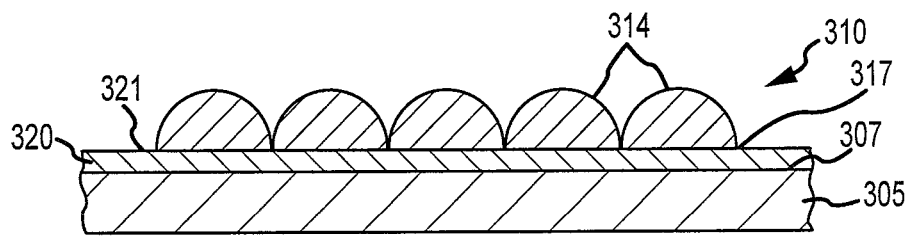

In an embodiment shown in FIGS. 3A and 3B, an item 300 (such as a piece of paper currency, a label for a product, or the like) is provided with an anti-counterfeiting element or device in the form of a lens array (round lens array) 310 covering or provided on top of a layer of ink 320 providing a printed image. As shown, the item 300 includes a substrate or body 305 such as a sheet of paper or plastic (e.g., paper to be used as currency or paper/plastic to be used for a product label). On a surface 307 of the substrate/body 305, an image is printed via a layer of ink 320, and a lens array 310 is provided on an exposed surface of the ink layer 320 (e.g., the ink layer 320 and its pattern/image may be printed onto the substrate surface 307 or onto the back surface of the lens array 310).

As shown, the lens array 310 is made up of a plurality of lenses 314 that each have a round base 317 abutting the surface 321 of the ink layer 320 and have a dome-shaped cross section as seen in FIG. 3B. The round-based lenses or round lenses 314 are arranged in a number of columns 312 that are parallel as shown by parallel vertical or Y-axes 313 (axes passing through the center of the lenses 314 in columns 312) in FIG. 3A. Further, the lenses 314 are arranged such that pairs of lenses 314 in adjacent ones of the columns 312 are in contact or proximate at least at the bases 317 (as seen in FIGS. 3A and 3B). Still further, the columns 312 are not vertically offset as seen in arrays 110, 210 of FIGS. 1 and 2 such that pairs of adjacent lenses 314 are aligned in rows as can be seen by parallel horizontal or X-axes 315 passing through centers of lenses 314 in the array 310 (e.g., the lenses 314 of the array 310 are both vertically and horizontally aligned due to the specific nesting shown in FIG. 3A).

Figure 4A:
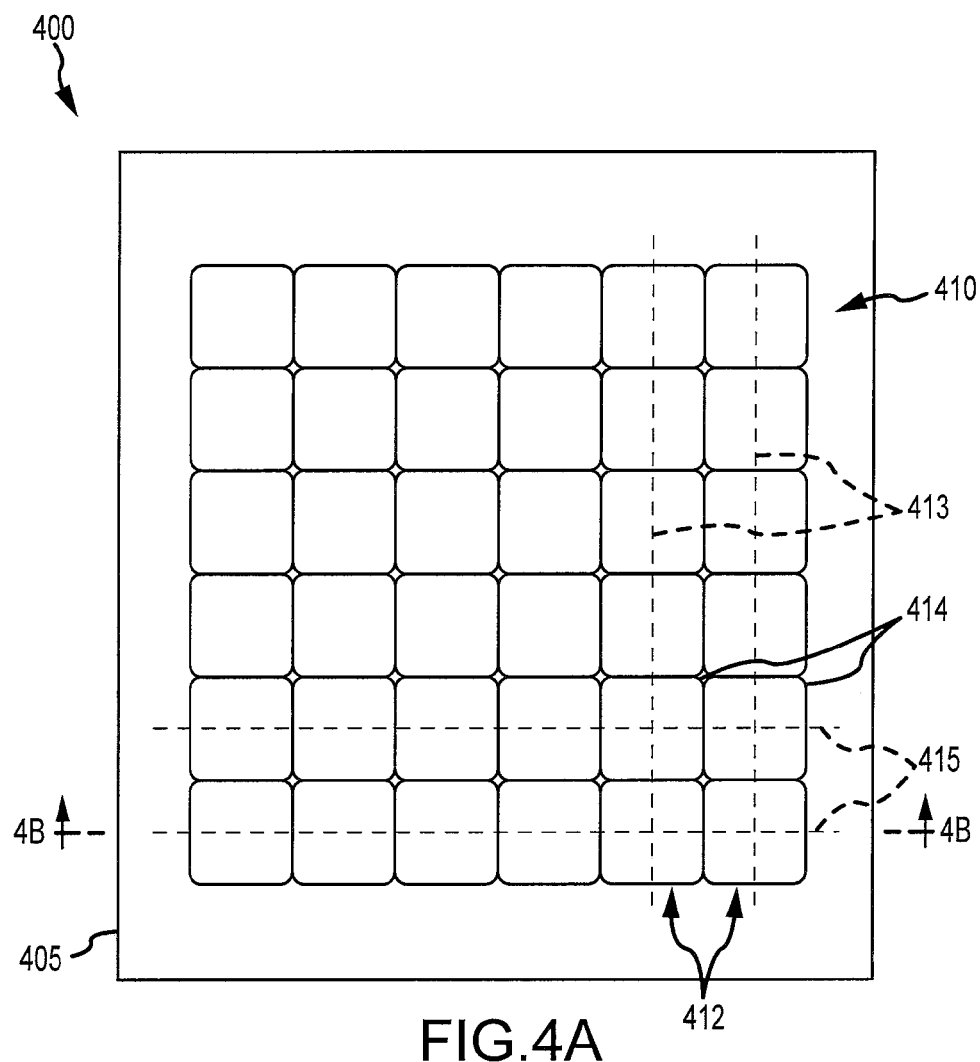
FIGS. 4A and 4B illustrate a top and sectional view taken at line 4B-4B, respectively, of an item such as a paper currency or label with an anti-counterfeiting device or element provided on a surface that is based on a square lens array.
Figure 4B:
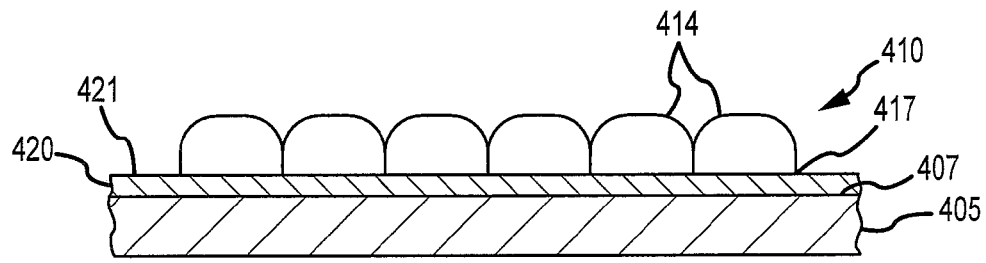

In an embodiment shown in FIGS. 4A and 4B, an item 400 (such as a piece of paper currency, a label for a product, or the like) is provided with an anti-counterfeiting element or device in the form of a lens array (round lens array) 410 covering or provided on top of a layer of ink 420 providing a printed image. As shown, the item 400 includes a substrate or body 405 such as a sheet of paper or plastic (e.g., paper to be used as currency or paper/plastic to be used for a product label). On a surface 407 of the substrate/body 405, an image is printed via a layer of ink 420, and a lens array 410 is provided on an exposed surface of the ink layer 420 (e.g., the ink layer 420 and its pattern/image may be printed onto the substrate surface 407 or onto the back surface of the lens array 410).

As shown, the lens array 410 is made up of a plurality of lenses 414 that each have a square base 417 abutting the surface 421 of the ink layer 420 and may have a dome-shaped cross section as seen in FIG. 4B. The square-based lenses or square lenses 414 are arranged in a number of columns 412 that are parallel as shown by parallel vertical or Y-axes 413 (axes passing through the center of the lenses 414 in columns 412) in FIG. 4A. Further, the lenses 414 are arranged such that pairs of lenses 414 in adjacent ones of the columns 412 are in contact or proximate at least at the bases 417 (as seen in FIGS. 4A and 4B). Still further, the columns 412 are not vertically offset as seen in arrays 110, 210 of FIGS. 1 and 2 such that pairs of adjacent lenses 414 are aligned in rows as can be seen by parallel horizontal or X-axes 415 passing through centers of lenses 414 in the array 410 (e.g., the lenses 414 of the array 410 are both vertically and horizontally aligned due to the illustrated nesting of the lenses 414).

In the lens arrays 310, 410, the lenses may be provided at a frequency of as few as 150 lenses per linear inch in both the X and Y axes or up to about 4000 lenses per linear inch on each of the X and Y axes. Note, the lenses are nested as shown in FIGS. 3A and 4A so that there is little or no interference from the adjoining or adjacent lenses when an image in ink layers 320, 420 is viewed by a viewer of the items 300, 400. Both stacked square-based and round-based lenses 414, 314 may be used to support the interlacing process described herein for providing the image/pattern in ink layer 320, 420. In some cases, the square-based lenses 414 may be preferred as these produce a fuller or full-filled image.

The ink layers 320, 420 are adapted or designed for use with the lens arrays 310, 410 to provide full volume 3D displayed images with or without multi-directional motion or animation. Particularly, images are interlaced, similar to lenticular images, in the X-axis and also then in the Y-axis to create full volume 3D interlaced images. The lenses 314, 414 have a point focus for a viewer, and the resulting image (displayed image from light reflected from the ink layers 320, 420 via the lens arrays 310, 410) to the viewer is a 3D image in all directions, regardless of the viewpoint.

At this point, it may be useful to compare and contrast the effects that can be produced with a pixel mapping arrangement in ink layers 320, 420 combined with the lens arrays 310, 410 versus a conventional moiré pattern-based assembly (see those shown in FIGS. 1 and 2) with the following effect listing: (1) float is provided by both moiré and pixel mapping according to the present description; (2) float height is limited to 100 percent with moiré patterns while 150 percent float can be achieved with pixel mapping-based embodiments; (3) 1-directional motion is provided by both techniques; (4) on-off is available/achievable only with pixel mapping techniques; (5) animation is also only available with the pixel mapping-based embodiments; (6) zoom cannot be provided using moiré patterns but can be provided with pixel mapping; (7) true 3D is provided only with the pixel mapping-based embodiments described herein; (8) movement in opposite directions is also achievable only with the pixel mapping-based embodiments of the present description; (9) one image up/one side is another effect available only with the use of the pixel mapping-based embodiments; and (10) full volume 3D is only available via the use of the lens arrays and pixel mapping taught herein. As a result of some or all of these effects or aspects of the two techniques, the moiré pattern-based anti-counterfeiting devices are easily reverse engineered while the pixel mapping-based anti-counterfeiting devices are impossible or nearly impossible to reverse engineer.

With a general understanding of the lens arrays and their configurations understood, it may be useful to discuss pixel arrangement, imaging, and mapping for circular-based and square-based lenses (e.g., design of the ink layers of the assemblies shown in FIGS. 3A-4B). Traditional lenticular printing (interlaced printing of images for use with lenticular lens arrays) uses a certain number of files that are created from different points of view (or viewpoints) in order to get a 3D effect. For example, a point of view in a single plane is moved to the left or to the right to create a next point of view. Traditional lenticular printing also uses different frames from a sequence of images to create some motion or animation or other visual effects. Once generated, the set of frames or files are combined in an interlaced file that is then printed onto the back of a lenticular lens array or onto a substrate upon which the lenticular lens array can be applied. The process to create the final file from the original frames is called "interlacing" (e.g., the process of striping and arranging printed information to a given pitch to match a particular lenticular lens array).

Figure 5:
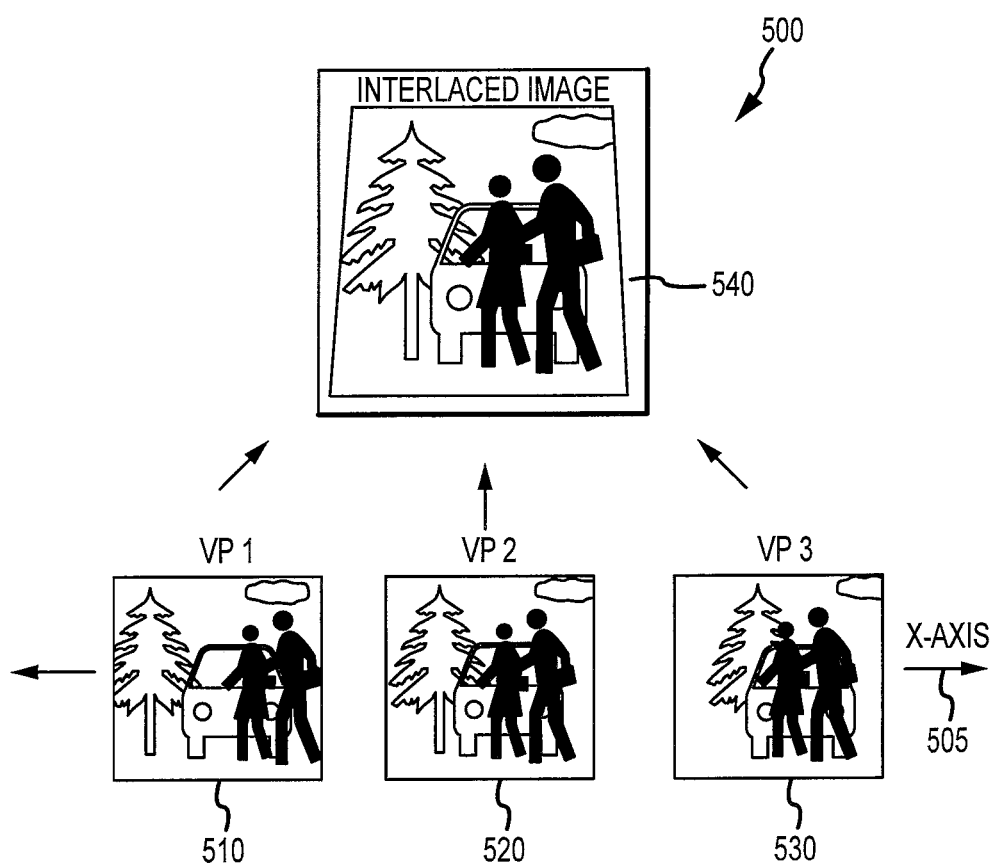
FIG. 5 shows a process of obtaining frames or images associated with differing points of view taken of a scene along the horizontal or X-axis.

The interlacing on traditional lenticular material has just one direction, and the interlacing depends on the lens direction so that the striping is either horizontal or vertical. This process combines the frames so that the observer can see the effect working either horizontally or vertically (but not both) according to the lens direction. FIG. 5 illustrates a process 500 in which a set of files of a single image or scene 540 viewed from three different viewpoints 510, 520, and 530 (such as −45 degrees, orthogonal, and +45 degrees or the like) are obtained for use in printing. The viewpoints 510, 520, and 530 are views from the same scene taken along the horizontal or X-axis. The frames or viewpoints 510, 520, 530 resulting from the points of views are slightly different and are then combined in an interlacing process. When this frame of interlaced images is combined with a sheet of lenticular material and viewed, the frame can generate depth perception or a 3D effect.

As shown in FIGS. 3A-4D, circular and square-based lenses may be used in a lens array with a printed image, and these lenses allow the effects to work in two directions concurrently, e.g., in the horizontal and vertical directions at the same time. The fact that the visual effects are created in all directions also demands that a more complete set of frames or views from the same scene be provided in the printed image (or ink layer) used with round or square lens arrays. With this recognition by the inventors, the inventors developed a new process (described below) for interlacing (or, more accurately, mapping, arranging, and imaging pixels) these sets of frames from a single scene.

Figure 6:
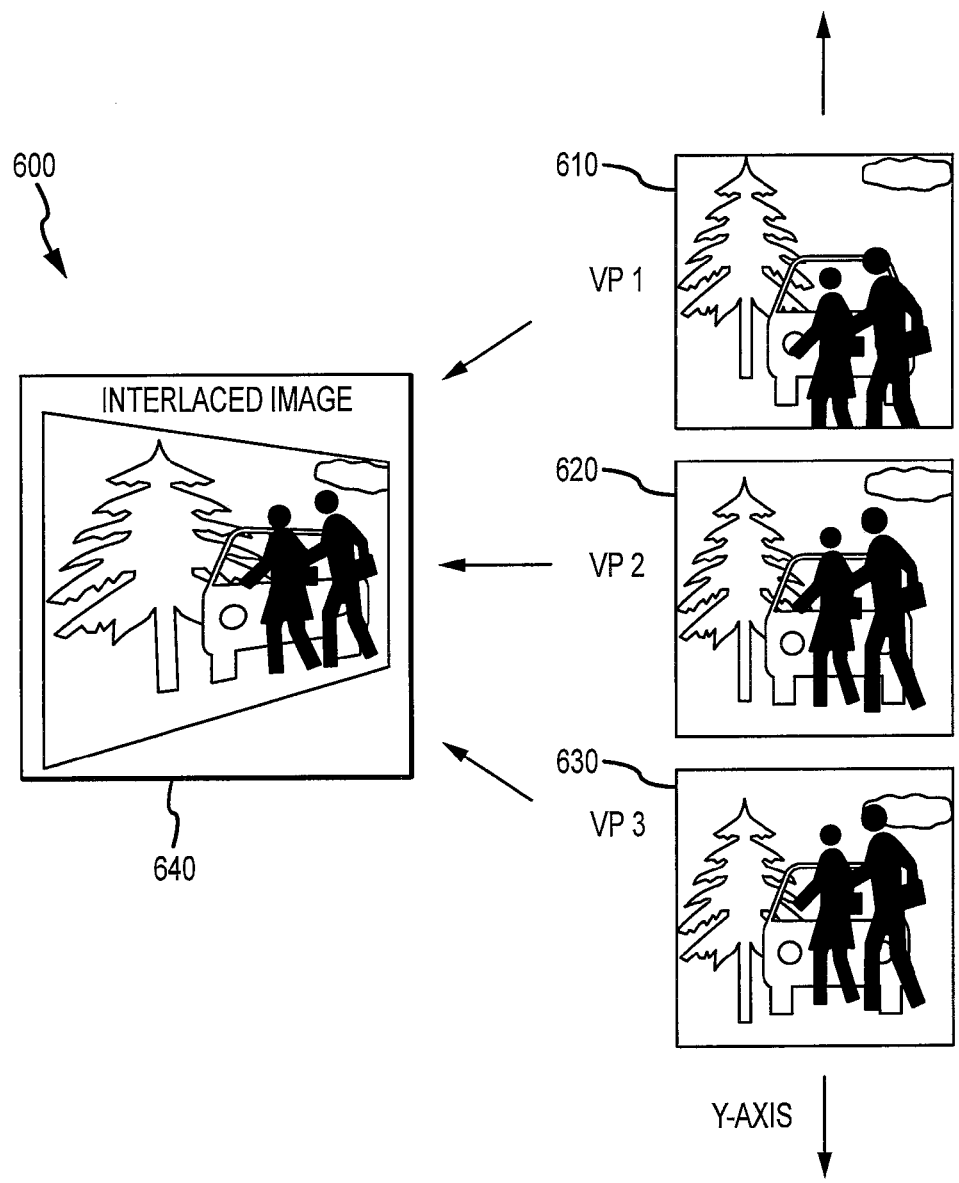
FIG. 6 shows a process of obtaining frames or images associated with differing points of view taken of the scene of FIG. 5 along the vertical or Y-axis.

For example, circular or round-based lenses allow one to have not only one set of points of view as shown in FIG. 5 that may be useful with traditional lenticular lenses but to also have different sets of points of view from differing heights (or along the vertical or Y-axis). FIG. 6 shows a process 600 for obtaining additional frames or views from the scene 640 (which may be the same as scene/image 540). As shown, frames 610, 620, 630 from three different viewpoints (e.g., +45 degrees relative to orthogonal to the Y-axis, orthogonal to the Y-axis, and −45 degrees relative to the Y-axis or the like) are obtained from an image 640 of a single scene.

One of the main differences between the presently described process and traditional lenticular printing, though, is the fact that now two or more sets of points of views or frames corresponding to such viewpoints are combined in an image file for printing. In other words, the interlacing is performed for view points along the vertical and along the horizontal axis. This means that instead of interlacing one sequence of frames the new interlacing process (or print file generation process) involves intelligently mapping a matrix of frames corresponding to differing viewpoints taken along both the X and Y-axes. In the present example, as shown in diagram 700 of FIG. 7, there are three sets 710, 720, 730 that each contains three frames 712, 714, 716, 722, 724, 726, 732, 734, 736. This may be thought of as selecting each horizontal or X-axis point of view (as shown in FIG. 5) and then generating two additional vertical or Y-axis points of view for a single scene (as shown in FIG. 6) (or vice versa).

Figure 7:
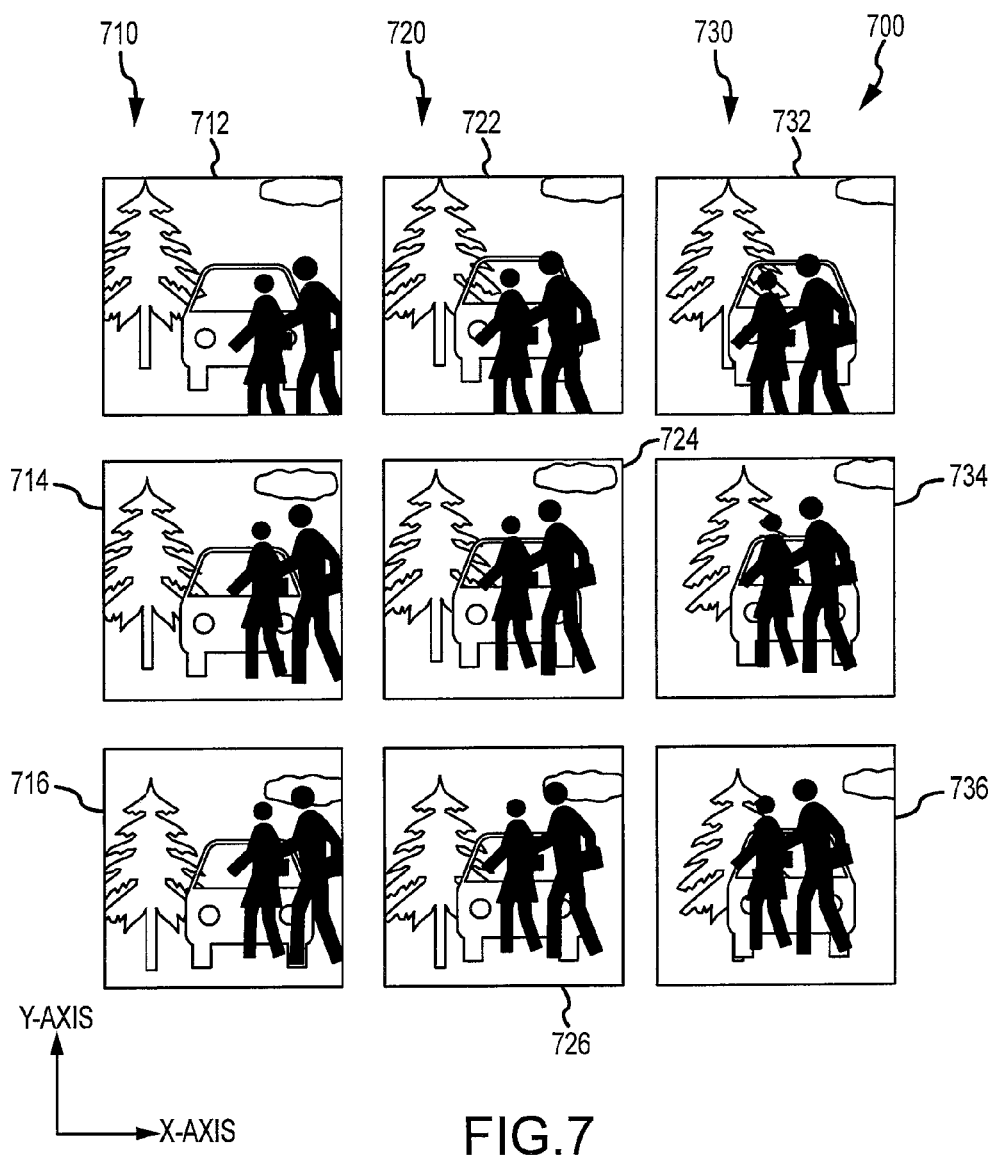
FIG. 7 illustrates a larger set of frames or images obtained by taking differing viewpoints of a scene at each point along the X-axis (or Y-axis), e.g., multiple sets of frames to provide height.

FIGS. 5-7 provide a simple example, but many other numbers of points of view may be utilized. For example, a traditional lenticular printing may involve use of 10 frames corresponding with 10 different view points along the X-axis (or Y-axis). In contrast, the presently described interlacing or image printing process would involve 10 sets of ten frames each so that the total number of frames provides a matrix of 100 frames. According to the present description, the interlacing or printing process then involves mapping and imaging each of the 100 frames in individual pixels.

At this point, it may be useful to describe in more detail the mapping and imaging of X and Y-axes pixels to obtain an image file that can be printed for use with one of the lens arrays described herein (such as for use on currency or a product label as part of an anti-counterfeiting device). The matrix of frame files (e.g., the matrix 700 of frame files of FIG. 7) is preferably combined in order to generate the file to print and that, when printed and used with a predefined/particular lens array, can generate a desired visual effect. For example, if one were to assume the use of six frames for each set of frames (instead of three as shown in sets 710, 720, 730 in FIG. 7), the matrix of frames would be (with the frame number providing the set number and the frame within that set):

| Frame 11 | Frame 12 | Frame 13 | Frame 14 | Frame 15 | Frame 16 |
| Frame 21 | Frame 22 | Frame 23 | Frame 24 | Frame 25 | Frame 26 |
| Frame 31 | Frame 32 | Frame 33 | Frame 34 | Frame 35 | Frame 36 |
| Frame 41 | Frame 42 | Frame 43 | Frame 44 | Frame 45 | Frame 46 |
| Frame 51 | Frame 52 | Frame 53 | Frame 54 | Frame 55 | Frame 56 |
| Frame 61 | Frame 62 | Frame 63 | Frame 64 | Frame 65 | Frame 66 |

Figure 8:
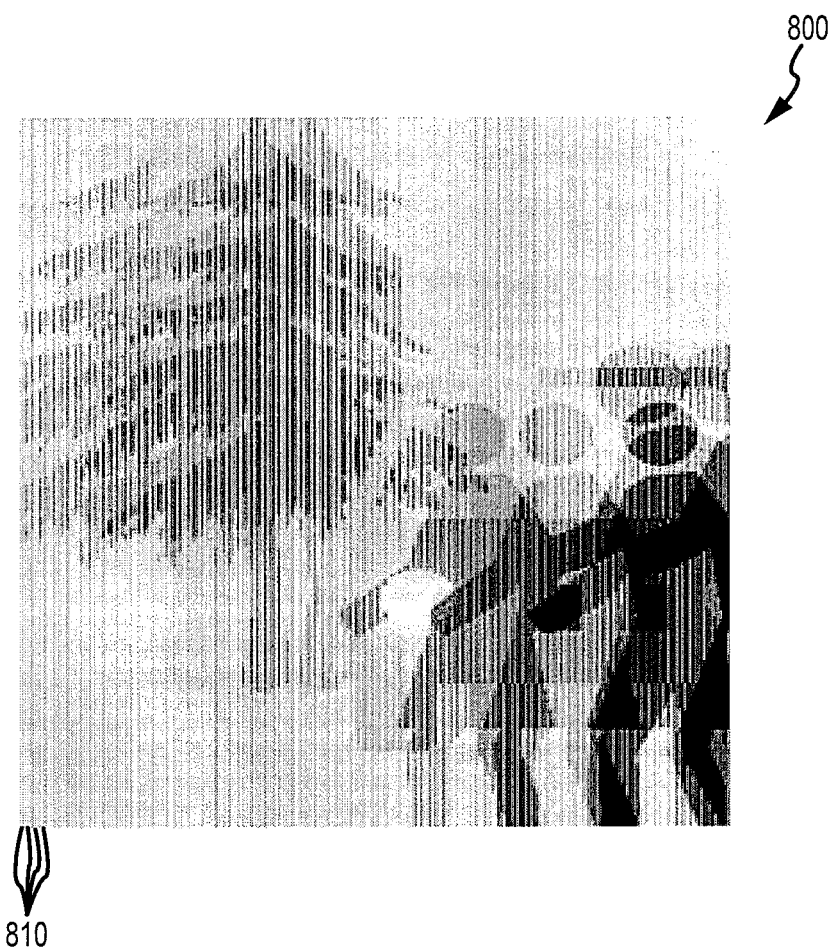
FIG. 8 illustrates an image provided by an exemplary interlaced file for one row of a matrix of frame files associated with multiple points of view (e.g., a vertically combined file)

A first step in mapping/imaging can be to combine in each row of frames from the matrix (e.g., as if vertical lenses were being used). This way a sequence of combined pixels is produced in the X axis from the same scene but from slightly different heights or points of view (from the Y axis). For example, the combining may start by interlacing the six frames from the first row of the matrix, interlacing the six frames from the second row, and so on until there is one interlaced file for each row of the matrix of frame files (images of a scene from differing points of view). It may be useful to name the image sequences on a sequence from the top to the bottom of the matrix, and the first interlaced file may be "IF 01", which is a result from the first row, and so on until we have a sixth interlaced file of "IF 06" from the sixth row for the exemplary (but not limiting) matrix provided above. FIG. 8 illustrates an image 800 using the images from the matrix 700 of FIG. 7 for one of the rows of the matrix. The resulting file providing image 800 is a combination of slices 810 from each frame in the particular row (interlaced image stripes or slices 810).

A second step in mapping/imaging is to combine these vertically combined files (X axis) into one final file to use in printing. The information that is useful or even needed is one horizontal slice to concurrently or simultaneously create the effect in the other direction. A second mapping process (horizontal) is performed, but this time using the previously generated vertical pixel files as the input to create the bi-directional (X and Y axis) frames.

In this second step it is desirable that: (1) the pixels in the files are vertically combined in the same sequence previously defined; (2) the files are regenerated with the horizontal information pursuant to the pixel map and, therefore, to create the print file; and (3) the result is a bi-directional pixel map with all of the 3D or motion information in both directions, which means that, instead of having stripes or slices, the final file has squares with the data from the matrix arranged in a way that is similar to the frames in the matrix. With regard to this third item, it may be important to note that when combined with the round or square-based lenses of an array, an image printed from this file will allow any viewpoint to be achieved/displayed to a viewer and will allow motion to be presented in any direction.

Figure 9:
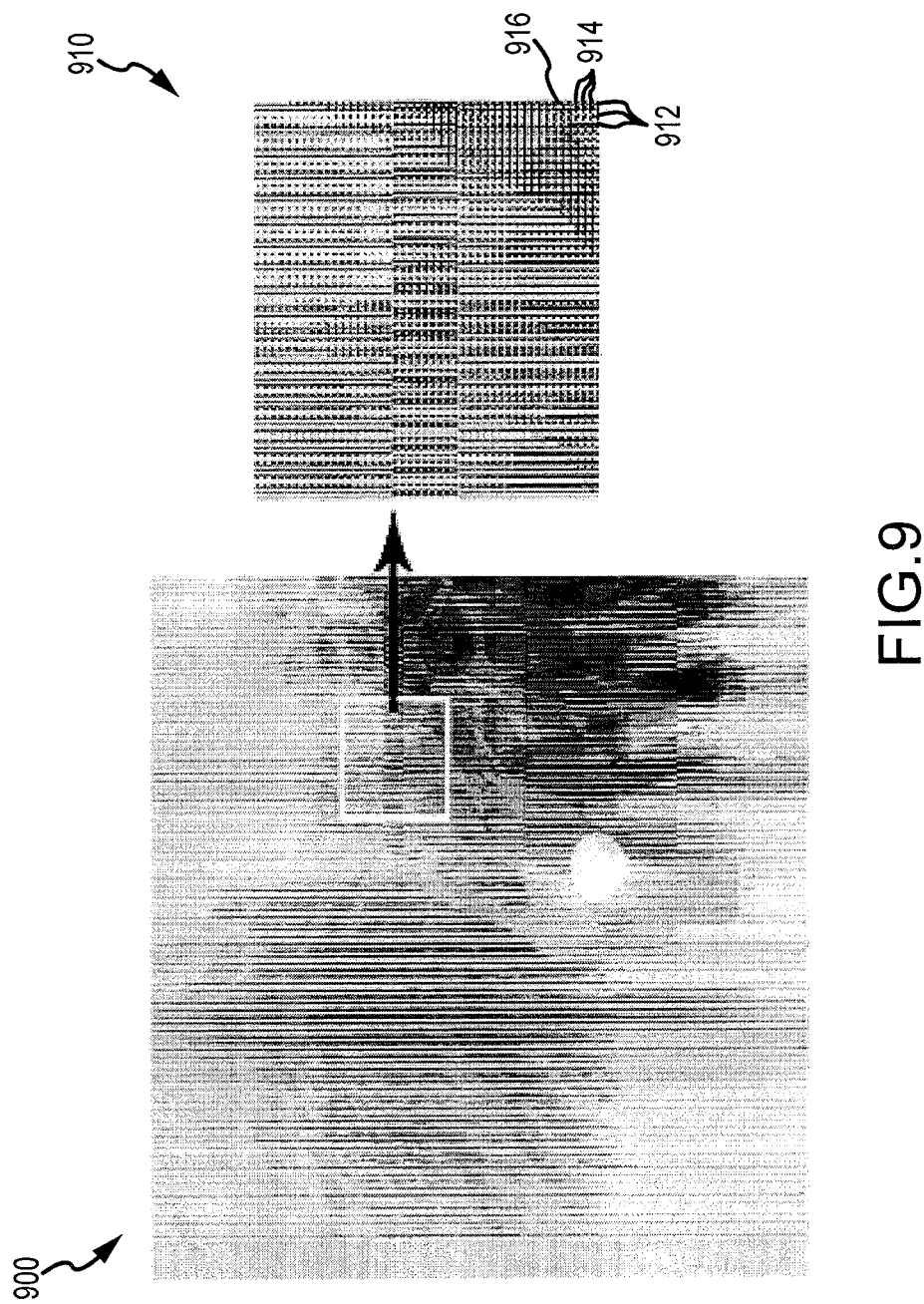
FIG. 9 illustrates an image provided by a combination print file (or two-way interlacing file or X and Y axis combination file) for use with a lens array of the present description.

FIG. 9 illustrates an image 900 that may be printed for use with a round or square-based lens array from a final print file output from this second mapping/imaging step. In this final linear image 900, one can see interlacing in a vertical direction with slices/stripes 912 and also in the horizontal direction with slices/stripes 914. The exploded and/or enlarged portion 910 is useful for showing this two-way interlacing and also for showing the "square" composition (see, for example, square 916) of this final print file (two axis combination file).

Mapping and imaging can also be performed using both the X axis and the Y axis to achieve a motion effect. In traditional lenticular printing, the idea is to get a loop in an interlaced print image with the sequence of frames that describes or provides motion. This "loop" concept is also useful for the printing described herein but, again, with circular or square-based lenses, one must process a matrix of frames. In order to get the loop sequence in all directions, the matrix typically should be arranged in a way that a loop sequence is viewed in each row and also in each line/column of the matrix simultaneously. For instance, if the input for printing is a sequence of six frames, the matrix of the 6×6 frames may be arranged as:

| Frame 5 | Frame 6 | Frame 1 | Frame 2 | Frame 3 | Frame 4 |
| Frame 6 | Frame 1 | Frame 2 | Frame 3 | Frame 4 | Frame 5 |
| Frame 1 | Frame 2 | Frame 3 | Frame 4 | Frame 5 | Frame 6 |
| Frame 2 | Frame 3 | Frame 4 | Frame 5 | Frame 6 | Frame 1 |
| Frame 3 | Frame 4 | Frame 5 | Frame 6 | Frame 1 | Frame 2 |
| Frame 4 | Frame 5 | Frame 6 | Frame 1 | Frame 2 | Frame 3 |

The arrangement provided in this matrix, when used to create a printed image, allows one to see a loop (through a circular or square-based lens array) in both directions (X and Y axis). The printed image also produces little to no distortion since each row and each column is slightly out of phase relative to the other nearby rows and columns. The interlacing process based on this matrix would then be the same as described above to obtain or produce a final interlaced file (also sometimes called an X and Y axes pixel file).

In order to create a quality image in micro lens printing (printing for use with the lens arrays shown herein), the optical pitch of the lens should precisely match the plate-making, proofing, or digital output device in two axes. In other words, the number of frames in both the X axis and the Y axis multiplied by the number of lenses should be equal (precisely equal in some cases) to the DPI (dots per inch) of the output device of the lenses' optical pitch. The exact lens LPI number that comes out of the construction of the sheets of lens array material is what is called mechanical pitch, but, depending on the viewing distance, those lenticules will focus on a different frequency meaning that when one combines the number of lines per inch of a certain frame there will not be a match with the number of lenticules per inch. Hence, a calibration process may be used (called a pitch test) to better determine the exact number of lines per inch that focus in that particular lens sheet or film at a given distance and for a particular printing device.

Stated differently, the X-axis frame count multiplied by the number of lenses (optical pitch) should be equal to the resolution of the output device (this should also hold true for the Y-axis). One challenge is that the DPI generated during printing, even when carefully engineered, may not match the optical pitch of the printed lens. This may be due to distortion in the web or sheet process and/or due to typical shrinkage or expansion and distortion in the manufacture of a film. Even if the film is made precisely to match the optical pitch of the output device, the pitch may change significantly as the film is printed due to cylindrical distortion that is common in all printing processes (e.g., flexo, gravure, offset, letterpress, holography, emboss and fill, and the like). Also, the distortion may be greater in the repeat direction of the web or sheet around the cylinder.

In the past, adjusting a file to match the target pitch and DPI was done in traditional linear lenticular optics with software tools such as Adobe PhotoShop or the like, and this process works well in a linear lens as may be used in a relatively course lens array. However, in a micro lens as used in the arrays discussed here (e.g., lenses provided at more than 200 LPI in any direction), the results using these conventional software tools or by simply allowing the rip in the image or place setter to make the adjustments are unsatisfactory as there may be severe quality problems. These quality problems may arise because the attempt to match the resolution, while it may work in some cases, often creates a corrupted file in which the image slices do not accurately stay in their channels relative to the lens array.

Again, this problem does not arise when using a thick lens array, but it is a problem that has to be addressed when using a micro lens array as taught herein because, otherwise, the image may become muddy or the printed image may not work at all to achieve the desired 3D or motion effects due to the rays in the channels mixing to the viewer. Such results are often due to uneven image slices and the interpolation of the files in the process. When examining the files microscopically after the adjustments made by the rip or other traditional graphic programs are used, one can see the interlaced slices are no longer uniform. Therefore, the images mix relative to the lens focus (e.g., one image may mix with another image (Image 2 mixes with Image 4 and so on), which significantly reduces the quality of the image provided to or viewed by a viewer). Hence, when one considers this problem or challenge in the context of dual X-axis and Y-axis, full volume interlacing, the problem/challenge is significantly compounded and the output can be particularly messy such that the displayed image is not pleasing or even understandable for a viewer.

In some cases, the desired optical pitch may be within some range of target (such as within 3 percent of the target). In these cases, devices (such as a VMR (Variable Main-scan Resolution) from Kodak or the like) may be used to adjust the files to a precise number. However, since this process only works in one axis, it is not very useful for X-axis and Y-axis or full volume interlacing as discussed herein. For the imagery to work and be adjusted properly to print the film in nearly any condition, the inventors recognized that the pitch should be adjusted precisely using other techniques/tools so that the output device can run at the parent resolution in both axes without adversely effecting the integrity of the X and Y-axes interlaced image. The channels in both axes preferably stay precisely as planned in the file relative to the target optical pitch of the lens. Alternatively, the file can be "scaled" to the target number by interlacing the file in both axes at the closest whole integer. Such scaling may be performed either above or below the target optical pitch resulting in a DPI higher or lower than the target DPI. By either manual or automated software, pixels can be added or subtracted throughout the file image.

It was previously mentioned that the number of frames used in the combined image multiplied by the optical pitch should be equal to the exact resolution of the output device in both directions. This may be stated as: NF×OP=DOR where NF is the number of frames, OP is the optical pitch, and DOR is the device output resolution. One typical situation in this regard is that, despite the fact that the number of frames can be chosen, the number of frames has to be an integer. Further, the number of lenses per inch may vary from time-to-time because of the production batch of the lenses and ambient conditions when printing. As a result, one option to make the above equation work properly is to combine the images by choosing an integer number of frames and an optical pitch (even if is not the required one) that is close enough to obtain the exact resolution of the output device. Then, a correction can be made on the file in a way such that the pitch is adjusted without changing the resolution.

Due to the complexity of this process, it may be useful to describe an exemplary (but not limiting) process of how these techniques can be successfully implemented to provide a printed image for use with a lens array of the present description. For example, a 2400 DPI output device may be used for printing a combined X-axis and Y-axis file, and the printed image is intended for use with a 240 LPI lens (mechanical) that has a 239.53 optical pitch. This means that it is desirable to combine 10 frames at 240 LPI to obtain the 2400 DPI needed for the assembly (e.g., an anti-counterfeiting device). So, the challenge presented is how to adjust the 240 LPI interlaced image to 239.53 without modifying the size of the file and losing the pixel integrity or changing the resolution.

To make this adjustment, it may be useful to enlarge the size of the file such as by 0.196 percent (i.e., from 240.0 divided by 239.53) while also keeping the same pixel size. To this end, a calculated number of pixel columns may be inserted that are in precise positions throughout the width of the file. In this particular example, if the file is 1 inch wide, the file has a total of 2400 pixels. Following this example further, one would need to insert 5 (4.7 rounded up to 5) pixels to decrease the interlaced LPI count while keeping the same resolution or pixel size. A software routine (or smart algorithm) may be implemented in a computer system (e.g., software or code stored in memory may be executed by a processor computer to cause the computer to perform the described functions on an image file stored in memory or accessible by the processor/computer) that acts to choose the right places to add or clone pixels or to take out the needed number of columns of pixels without distorting the images.

Figure 10:
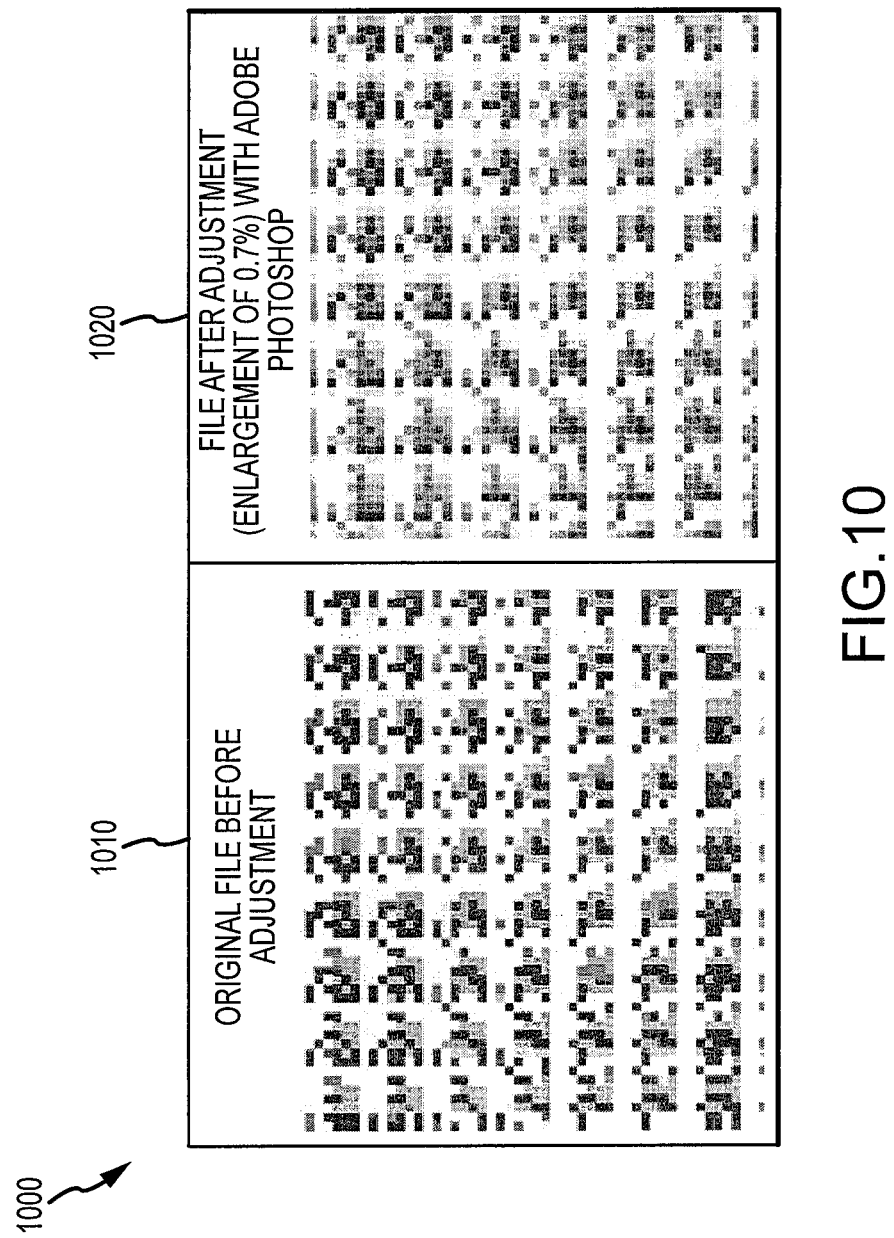
FIG. 10 illustrates a side-by-side comparison of an image of an original combination print file and an image of a combination print file adjusted (enlarged) as discussed in the description.

FIG. 10 provides a side-by-side comparison 1000 showing an image 1010 provided by an original combination (or dual axis) print file and an image 1020 provided by the same print file after adjustment. The adjustment, in this example, was an enlargement of 0.7 percent via Adobe Photoshop. The image comparison 1000 shows how a simple pitch adjustment can ruin the pixel integrity if using a simple single axis or other traditional size adjustment technique. As will be understood from FIG. 10, the image 1020 after adjustment is no longer pristine and the focus of the lenses of an array will likely yield a blurry image or an image that simply does not contain the targeted or desired visual effects (such as 3D in two directions or motion). The adjustment involving enlargement using one axis or an automatic adjustment through the rip acts to mix the images viewable by a viewer in an inconsistent way.

For example, ray mixing to the viewer occurs when the images of the matrices described above are reproduced or adjusted using Adobe Photoshop or other automatic processes. This is because the pixels are no longer uniform in both axes. Therefore, the lenses of a circular or square-based lens array focus on inconsistent numbers and the rays mix to the viewers. Instead of the viewer receiving all number "3's," the viewer may receive information under number "1's" and "4's" or the like at the same time. The viewing result or displayed image is of poor quality. The pixels' height and width are no longer the uniform exact height and width needed to achieve a good result as each pixel can vary in the printed image. The result is that the lenses focus on different images (rather than on the specific intended pixels), and the image is no longer pristine and, in many cases, is not even viewable.

Figure 11:
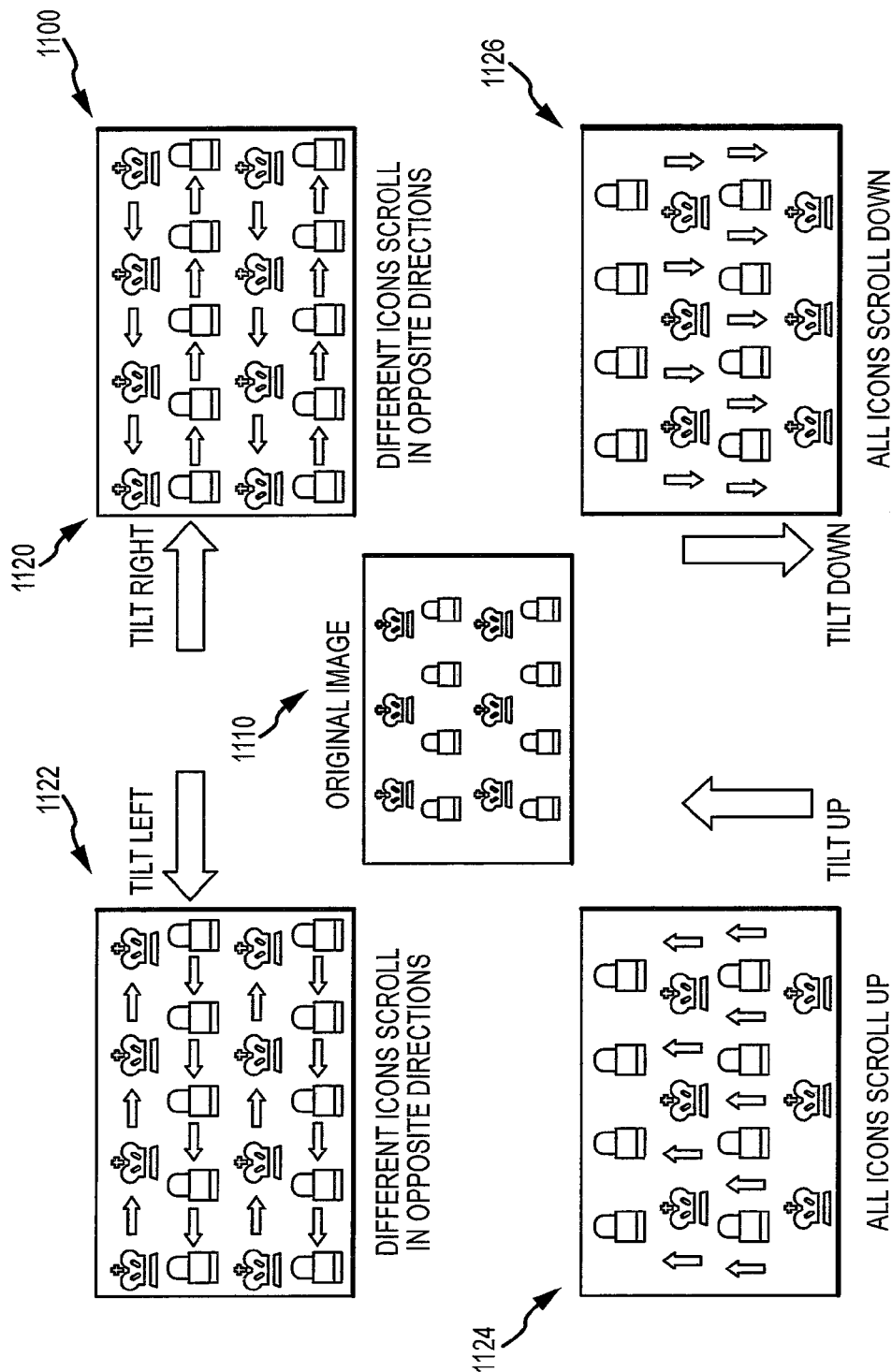
FIGS. 11 and 12 illustrate views of two exemplary assemblies viewed from differing POVs, with the assembly being useful as anti-counterfeiting devices for currency or the like that are configured with a lens array and printed image to provide differing motion effects.
Figure 12:
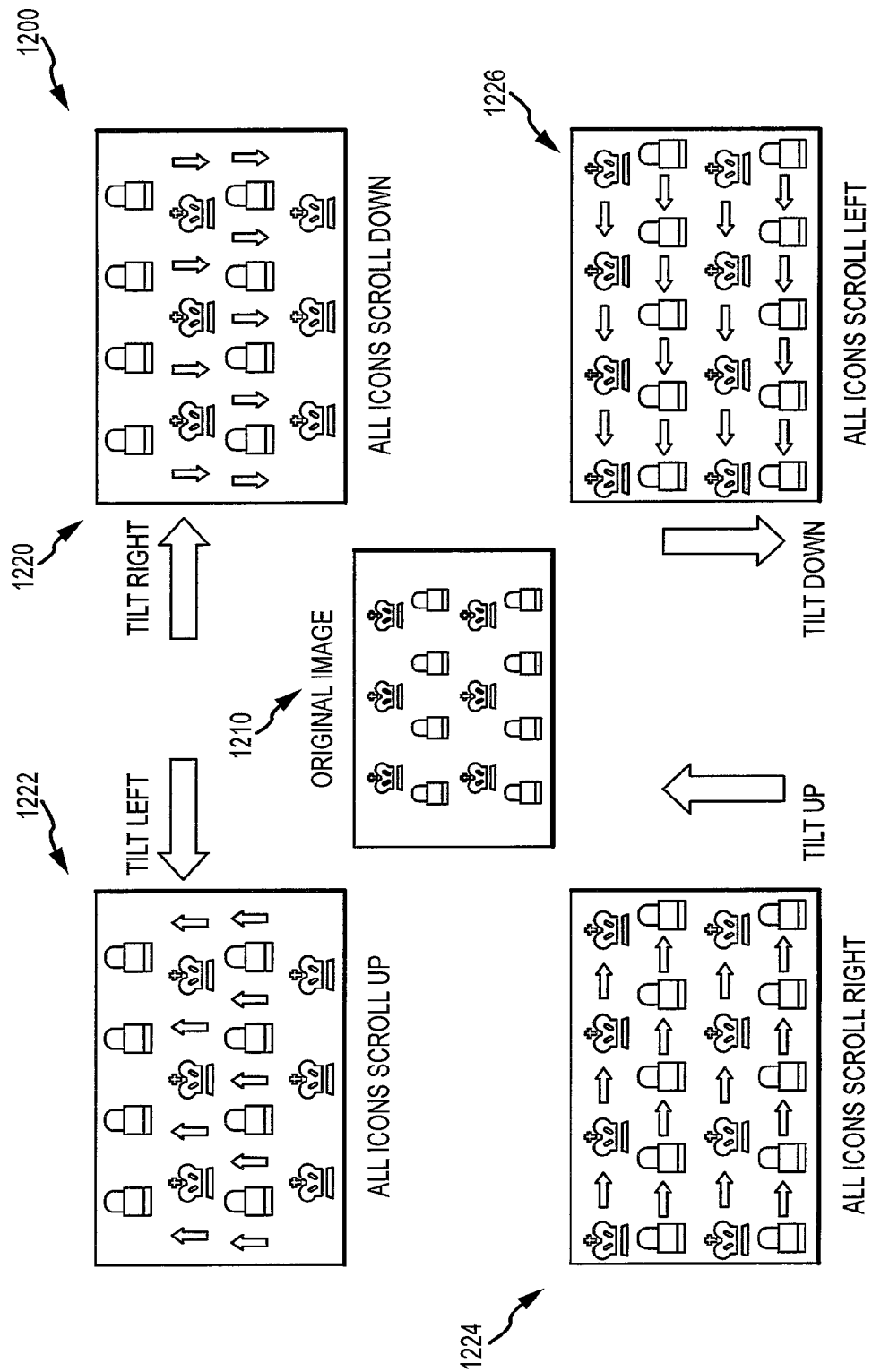

FIGS. 11 and 12 illustrate two exemplary assemblies useful as anti-counterfeiting devices for currency or the like that are configured with a lens array and printed image to provide differing motion effects. Particularly, the sets 1100 and 1200 of diagrams in FIGS. 11 and 12 are useful for showing how the round or square-based lens arrays when combined with a printed image with dual-axis interlacing/combination described herein can be effectively used to provide selected motion effects. Due in part to the complex interlacing processes, the assemblies shown in FIGS. 11 and 12 are particularly useful as anti-counterfeiting devices (which may be applied to currency, product labels, and other objects/items) as they are very difficult to reproduce.

In the diagrams 1100 of FIG. 11, a plan or orthogonal view 1110 of a lens/image assembly according to the present description is shown. The viewer is able to observe or view an original image with rows of two differing icons with the icons all being stationary or non-moving. In diagram or view 1120, the assembly is tilted or angled to the right (e.g., through or to an angle of 15 to 45 degrees or the like), and the interlacing of the matrix of frames (a set of different points of view (POVs) of the original image shown in view 1110 such as a matrix similar to that shown in FIG. 7) is configured to cause the rows of different icons to move in opposite directions. For example, rows with padlock icons move to the right while company logos/icons move to the left. In contrast, in diagram or view 1122, the assembly is tilted or angled to the left (e.g., through or to an angle of 15 to 45 degrees or the like), and the interlacing of the matrix of frames is configured to cause the rows of different icons again to move in opposite directions. For example, rows of padlock icons may move to the left while the company logos/icons concurrently move to the right. In other words, the printed image is adapted to provide animation of the original image when the lens/printed image (or ink layer) is viewed from differing angles or points of view (e.g., the assembly or anti-counterfeiting device shown in view 1110 is pivoted about a first or vertical axis).

Significantly, the assembly of an array of lenses with an ink layer providing a dual-axis interlaced image provides animation or motion in more than one direction. In diagram or view 1124, the assembly is tilted or angled upward (e.g., through or to an angle of 15 to 45 degrees or the like by pivoting about a second or horizontal axis of the assembly), and the interlacing of the matrix of frames (a set of different points of view (POVs) of the original image shown in view 1110 such as a matrix similar to that shown in FIG. 7) is configured to cause the rows of different icons to move in a single direction (e.g., all move upward). In contrast, in diagram or view 1126, the assembly is tilted or angled downward (e.g., through or to an angle of 15 to 45 degrees or the like about a horizontal axis of the assembly), and the interlacing of the matrix of frames is configured to cause the rows of different icons again to move in a single direction (e.g., all move downward). In other words, the printed image is adapted to provide animation of the original image when the lens/printed image (or ink layer) is viewed from differing angles or points of view (e.g., the assembly or anti-counterfeiting device shown in view 1110 is pivoted about a second or horizontal axis).

In the diagrams or views 1200 of FIG. 12, a plan or orthogonal view 1210 of a lens/image assembly according to the present description is shown. The viewer is able to observe or view an original image with rows of two differing icons with the icons all being stationary or non-moving. In diagram or view 1220, the assembly is tilted or angled to the right (e.g., through or to an angle of 15 to 45 degrees or the like), and the interlacing of the matrix of frames (a set of different points of view (POVs) of the original image shown in view 1210 such as a matrix similar to that shown in FIG. 7) is configured to cause the rows of different icons to move in a single direction (rather than in opposite directions as shown in 1120 of FIG. 11). For example, rows with padlock icons and company logos/icons all move to downward when the assembly (or anti-counterfeiting device) is tilted to the right. In contrast, in diagram or view 1222, the assembly is tilted or angled to the left (e.g., through or to an angle of 15 to 45 degrees or the like), and the interlacing of the matrix of frames is configured to cause the rows of different icons again to move in a single direction such as upward. In the embodiment shown in FIG. 12, the printed image is adapted to provide animation of the original image when the lens/printed image (or ink layer) is viewed from differing angles or points of view (e.g., the assembly or anti-counterfeiting device shown in view 1210 is pivoted about a first or vertical axis). The animation as shown can be in a direction that is transverse relative to the pivoting directions.

Significantly, as discussed relative to FIG. 11, the assembly of an array of lenses with an ink layer providing a dual-axis interlaced image provides animation or motion in more than one direction. In diagram or view 1224, the assembly is tilted or angled upward (e.g., through or to an angle of 15 to 45 degrees or the like by pivoting about a second or horizontal axis of the assembly), and the interlacing of the matrix of frames (a set of different points of view (POVs) of the original image shown in view 1210 such as a matrix similar to that shown in FIG. 7) is configured to cause the rows of different icons to move in single direction but that one that differs from that found during left or right tilting (e.g., all move or scroll to the right). In contrast, in diagram or view 1226, the assembly is tilted or angled downward (e.g., through or to an angle of 15 to 45 degrees or the like about a horizontal axis of the assembly), and the interlacing of the matrix of frames is configured to cause the rows of different icons again to move or scroll in a single direction (e.g., all move to the left). In other words, the printed image is adapted to provide animation of the original image when the lens/printed image (or ink layer) is viewed from differing angles or points of view (e.g., the assembly or anti-counterfeiting device shown in view 1210 is pivoted about a second or horizontal axis).

Figure 13:
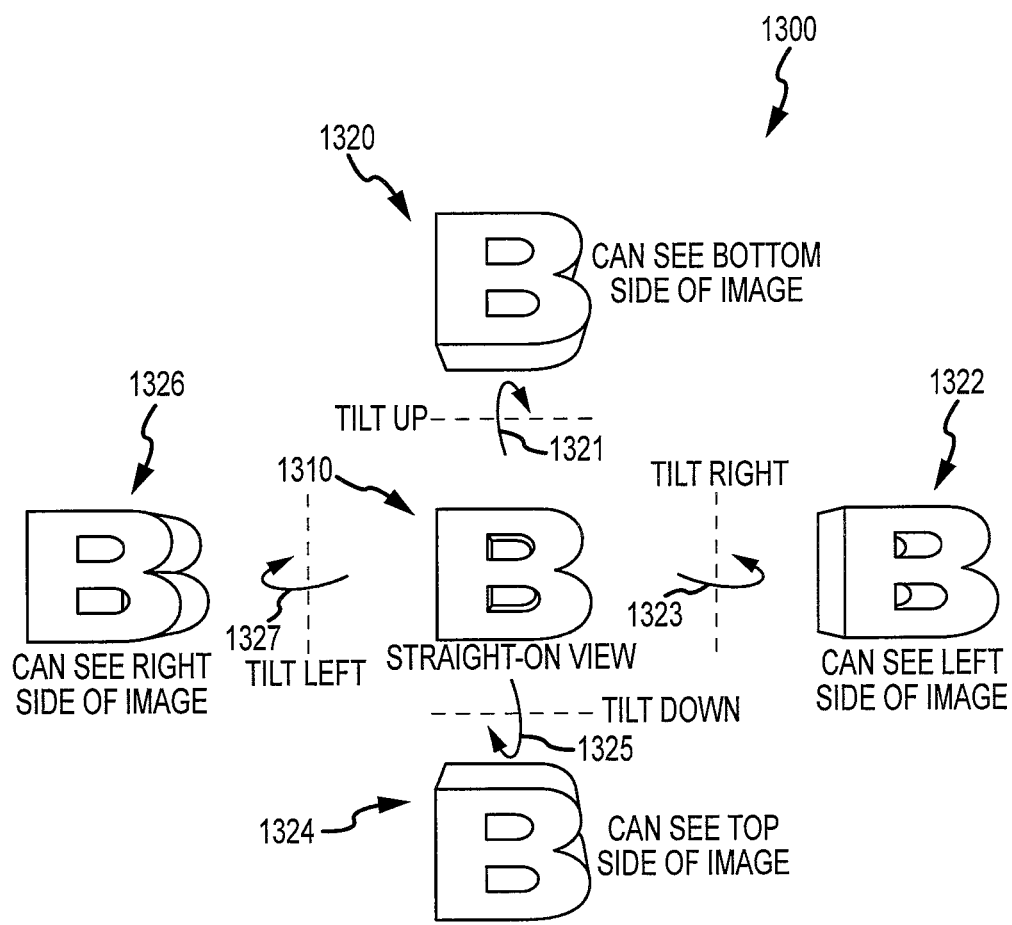
FIG. 13 illustrates a number of views of another exemplary lens/printed image (ink layer) assembly (or anti-counterfeiting device) from a number of differing POVs.

FIG. 13 illustrates a set of images or views 1300 of another lens/printed image (ink layer) assembly as may be seen by a viewer in differing positions or with the assembly tilted or moved to change the viewing angle for the viewer. The assembly may take the form of an array of round or square-based micro lenses overlying a dual-axis interlaced image (printed onto the back, planar surface of the lens array or on a substrate (e.g., paper currency, a plastic card, a paper or plastic label, or the like) upon which the lens array is later attached). The interlaced image is printed using a print file that is generated as discussed above to combine a matrix of frames (e.g., sets of 2 to 4 or more frames of a single image/scene taken at differing POVs relative to the horizontal and vertical axes).

In FIG. 13, image or view 1310 shows a straight-on or orthogonal view of the assembly or anti-counterfeiting device, and the image is a company logo in this example. Image or view 1320 is visible to a viewer when the assembly is tilted up as shown with arrow 1321 (the planar assembly is rotated upward about a horizontal or first axis of the assembly). As shown, view/image 1320 shows additional information relative to the original image seen in view 1310 such as the bottom side of the logo or object that has been the subject of the interlaced image file. Another image or view 1322 is visible by a viewer when the assembly is rotated or tilted to the right as shown with arrow 1323 (the planar assembly is rotated or tilted about a vertical axis (e.g., a second axis orthogonal or at least transverse to the first axis of the assembly)). More information or imagery is visible in the view 1322 such as the left side of the logo or other object that was the subject of the interlaced image file.

Further, another view or image 1324 is viewed when the assembly is rotated or tilted 1325 downward (rotated about a horizontal or first axis), and, in this view 1324, information not seen in the other views is presented such as the top side of the logo or other imaged object. View or image 1326 provides more information or portions of the target object such as the right side of the logo/target object, and the view 1326 is visible when the assembly is rotated or tilted 1327 about a vertical or the second axis of the assembly.

Figure 14:
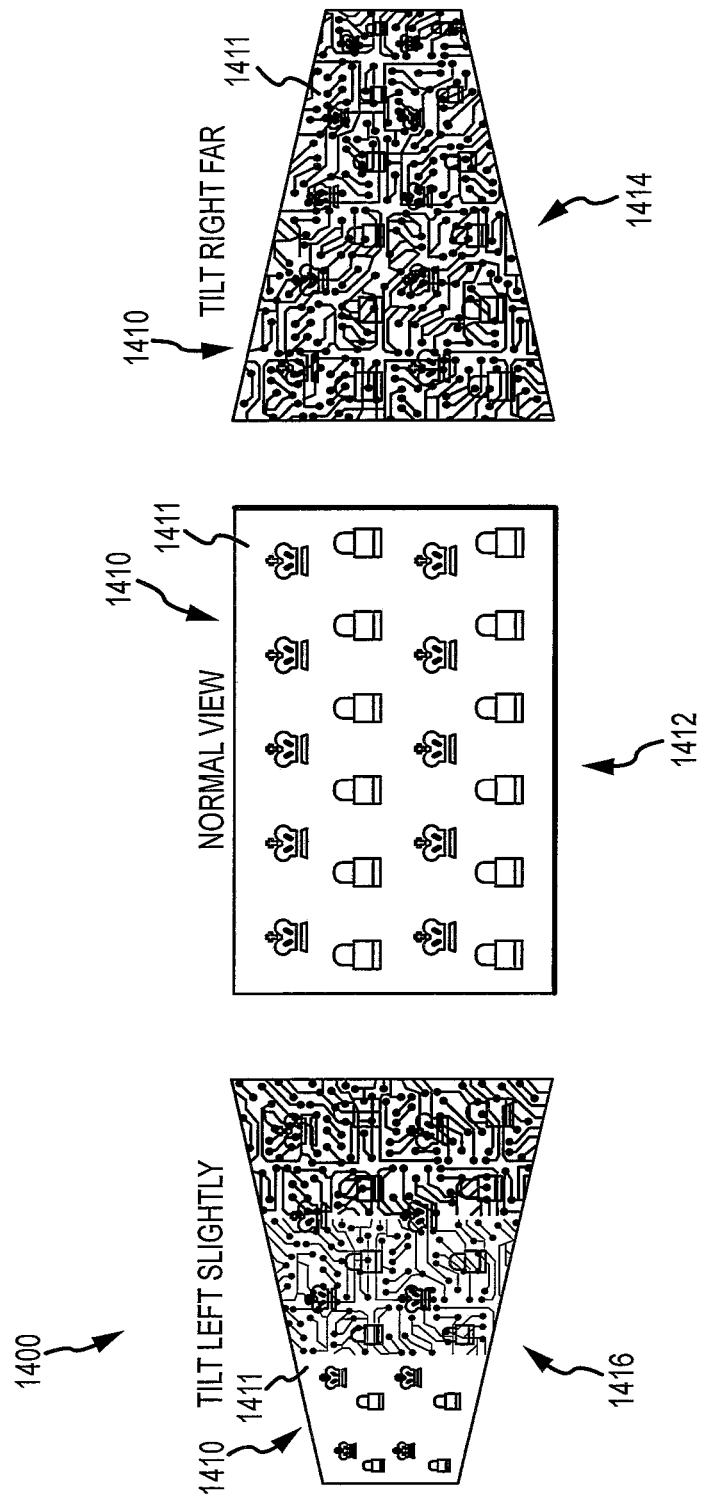
FIG. 14 illustrates a normal (or orthogonal/plan) view and tilted left and right views of another lens/printed image assembly (anti-counterfeiting device)

FIG. 14 illustrates a set of views/images 1400 of another embodiment or implementation of a lens/printed image assembly (or anti-counterfeiting device) 1410. As shown in view/displayed imagery 1412, the assembly 1410 (a micro lens array as described herein positioned over Drip a dual-axis interlacing of a matrix of frames corresponding to differing images of a scene/object from differing points of view) is seen from a point of view that is normal or orthogonal to a front surface 1411 of the assembly 1410. In some embodiments, the front surface 1411 is provided by the outer surfaces of an array of round or square-based lenses. As shown, the viewer can see a background that contains a static wallpaper pattern (of icons and padlocks). The icons/image components may appear very deep in the plane of the film and may be visible in each viewing angle (e.g., are visible in views 1414, 1416 when the assembly 1410 is tilted right or left). The overlay pattern is in the plane of the film but is not visible (or only slightly visible) when viewed straight on as shown in view 1412 (but can be seen in views 1414 and 1416).

View 1416 is useful for showing a display provided by the interlaced image of assembly 1410 when the assembly is tilted at a shallow angle (tilted or rotated slightly to the left about a vertical axis). When tilted at a shallow angle (e.g., up to about 15 degrees or the like), the overlay pattern is only visible in black on the area of the film or front surface 1411 of the assembly 1410 that is closest to the viewer. The printed image may be configured such that tilting slightly (e.g., less than about 15 degrees) in any side direction (up, down, left, or right or rotating of the assembly 1410 about either the vertical or horizontal axis) causes the overlay pattern to gradually become visible (appears black in this example). The pattern is an "overlay" that appears to be on the top of or covering over the icons or wallpaper pattern in the plane of the film (or outer surface 1411 of the assembly 1410).

At shallow angles, the overlay is first visible on the portion of the film or assembly 1410 closest to the viewer. When the assembly 1410 is tilted further away from the viewer (such as to angles of about 30 to 45 degrees or more), more and more of the overlay pattern gradually becomes visible until the entire overlay pattern is visible when the assembly 1410 is viewed via surface 1411 at a predefined more extreme angle (e.g., an angle of 45 to 60 degrees or more relative to the normal view 1412). This can be seen in extreme angle view 1414 of FIG. 14 where the assembly 1410 is rotated about a vertical axis (e.g., to the right) more than about 60 degrees. In view 1414, the overlay pattern is fully visible over the wallpaper pattern with the icons (logos and padlocks in this example) over the entire surface 1411 of the assembly/film 1410.

Figure 15:
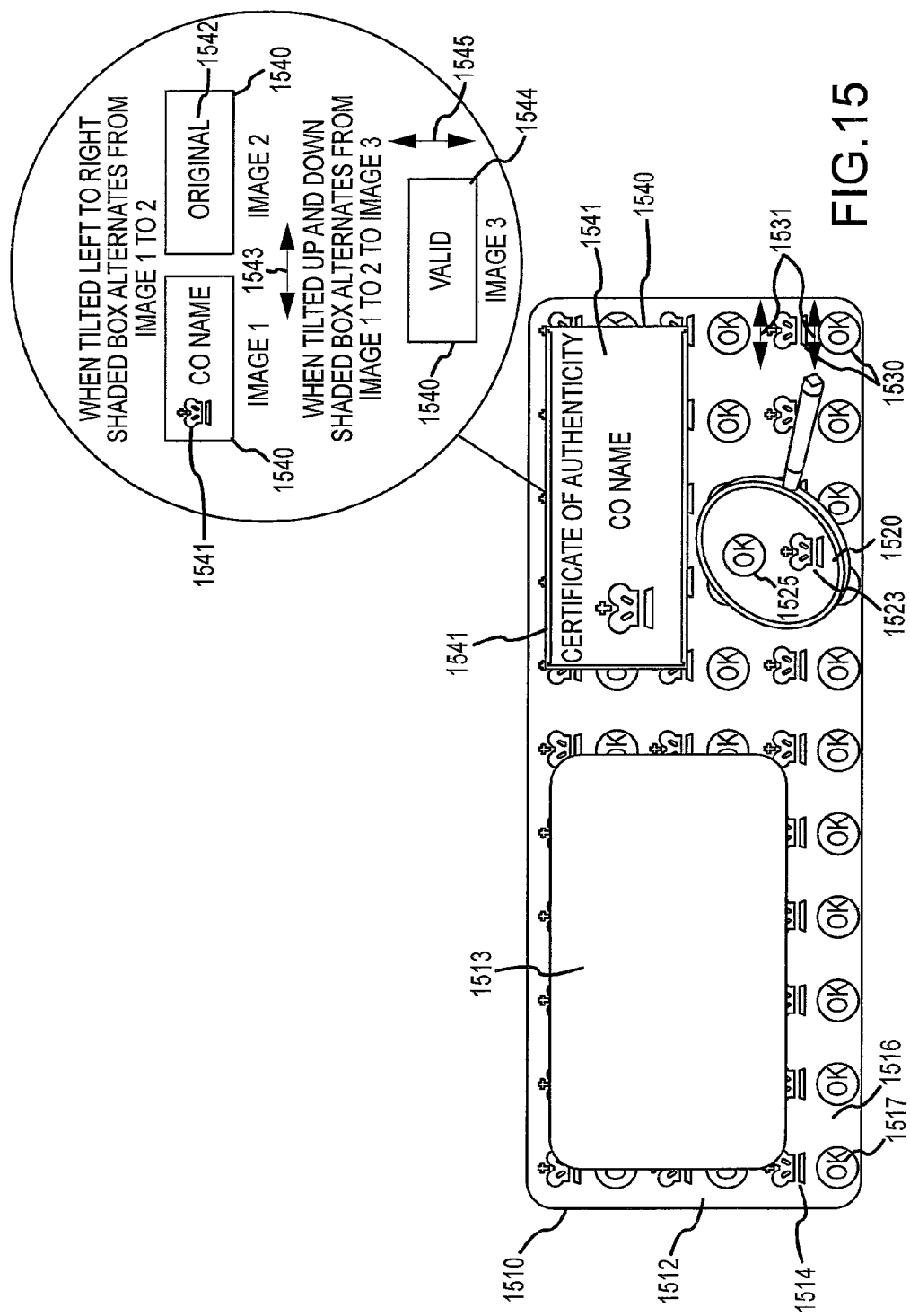
FIG. 15 illustrates an assembly (e.g., an anti-counterfeiting device in the form of a label) incorporating a micro lens array provided over an ink layer containing a dual-axis interlaced set of images as described herein.

FIG. 15 illustrates an assembly 1510 of another embodiment of the present description. The assembly 1510 may be configured for use as an anti-counterfeiting device or label with a body/substrate, an ink layer providing a printed image with dual-axis interlacing of a matrix of differing POV frames as discussed herein, and an array of round or square-based lenses for viewing the printed image. For example, the assembly 1510 may be a label (e.g., a 2-inch by 1 inch or other sized label) that may be printed down a web on 1.125-inch centers or the like during its manufacture. The assembly 1510 includes a front or upper surface 1512 (e.g., a thin lens array formed of transparent or at least translucent plastic or similar material) through which an interlaced image may be viewed as shown. The printed image may include a void or blank space as shown with white (or other-colored) box 1513, which may be used for printing (e.g., flexo) barcodes and/or human-readable text, which may be added offline or in later processing (e.g., via thermal transfer printing).

The assembly/label 1510 has a printed image that has been specifically designed to provide a number of images and effects to make it more difficult to reproduce and to allow a viewer to readily verify its authenticity. For example, the printed image presents a gray background 1516 (e.g., that may be subsurface printed (e.g., flexo)) upon which icons or symbols 1514, 1517 (colored and/or black) may be printed or layered. The symbol 1517 may take the form of a boundary (e.g. a circle) in which a second symbol or text is provided such as text (e.g., "OK") that should be completely inside the boundary to show the label 1510 is not a counterfeit or is authentic.

The printed interlaced image may also include devices/components for further allowing a viewer to check the authenticity of the label 1510. For example, a magnifying glass image 1520 may be incorporated into printing plates used to fabricate the assembly/label 1510 and appear on the plane of the film or surface 1512. One or more of the icons/symbols 1523, 1525 may be provided within the image 1520 such as under the glass of the magnifying glass of image 1520. Then, the printed image may be configured such that, when a viewer looks through the glass area of image 1520, the icons 1523 appear black and the icons 1525 appear blue, which may be a different color than these icons 1514, 1517 appear in the rest of the label 1510 (e.g., reverse the coloring of these icons when viewed under the glass image 1520). Further the icons 1523 and 1525 under the magnifying glass image 1520 may appear to be somewhat larger in size than the corresponding wallpaper/background versions of these icons 1514, 1517.

The wallpaper icons 1530 may be designed to move in opposite (or the same) directions when the assembly 1510 is tilted about a first axis (e.g., the assembly/label is rotated/tilted to the left or right) while moving in the same (or opposite) directions when the assembly 1510 is tilted about a second axis (e.g., the assembly/label is rotated/tilted upward or downward). In contrast in some embodiments of the label 1510, the corresponding icons/symbols 1523, 1525 under the magnifying glass image 1520 may be designed to move differently than those 1530 that are not under the glass. For example, the icons 1523, 1525 may move together in a single direction under the glass image 1520 while the icons 1530 move as shown with arrows 1531 in opposite directions when the assembly 1510 is rotated/tilted about a particular axis.

The printed image under the lens array of assembly 1510 may include a further element (e.g., a boxed/bordered display) 1540 to enhance security (or limit counterfeiting efforts further). The element 1540 may include a border, which may be formed of a pattern that is difficult to reproduce such as a 0.15-mm (or other size) microtext border containing one or more intentional misspellings (e.g., the border appears solid to the naked eye of a viewer but misspelled words are evident under a microscope). In the normal view as shown in FIG. 15, a first image 1541 is displayed but, as shown in the exploded view, a second image 1542 is displayed in the element 1540 when the assembly 1510 is rotated 1543 about a first axis (e.g., rotated right or left about a vertical axis of assembly 1510). To further enhance security, a third image 1544 may be displayed in the element 1540 when the assembly 1510 is rotated 1545 in another direction (e.g., rotated up or down about a horizontal axis of assembly 1510).

Figure 16:
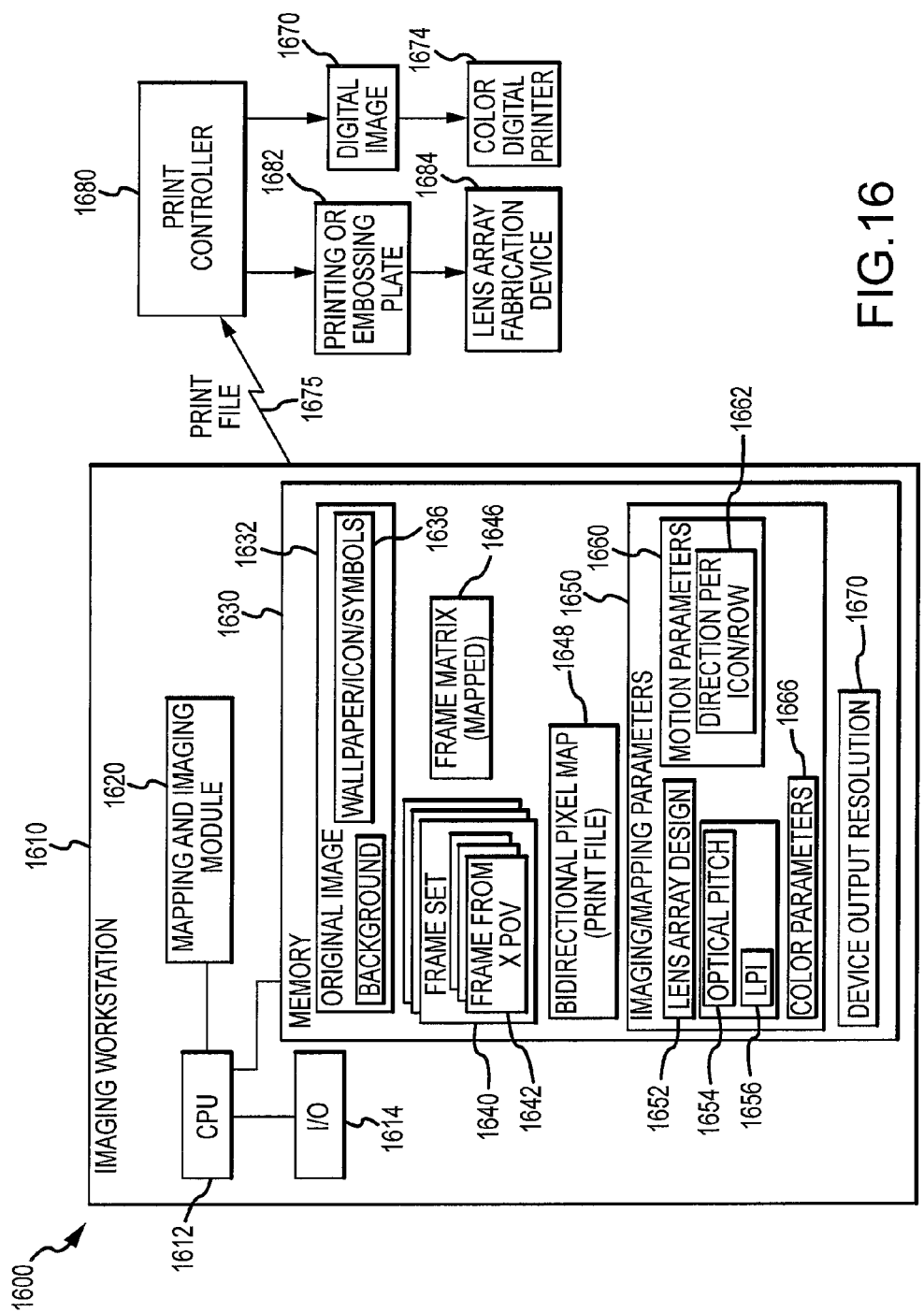
FIG. 16 is a functional block diagram or schematic of a system for use in manufacturing anti-counterfeiting devices or lens/printed image assemblies of the present description.

FIG. 16 illustrates a system 1600 adapted for use in fabricating an assembly such as an anti-counterfeiting device as described herein. The system 1600 includes an imaging workstation 1610 with a processor 1612 for executing code or software programs to perform particular functions. The workstation 1610 may take the form of nearly any computer device with the processor 1612 acting to manage operation of input and output devices 1614 such as devices for allowing an operator of the station 1610 to view and input data useful by the mapping and imaging module 1620 to create a print file 1648 communicated as shown at 1675 to a print controller 1680. The CPU 1612 also manages memory 1630 accessible by the mapping and imaging module 1620.

The mapping and imaging module 1620 performs the functions useful in performing the functions and processes described herein such as for generating frame sets 1640 from an original image 1632, creating a frame matrix 1646 from these image sets 1640, and producing a bidirectional bit map or print file 1648 from the frame matrix 1646. For example, the memory 1630 may be used to store an original image 1632 that may include a background as well as one or more icons/symbols 1636 that may be provided as wallpaper (e.g., these elements may be layered over the background).

The module 1620 may act to generate a number of sets of frames 1640 from the original image 1632, and each of the sets 1640 may include 2 to 10 or more frames from differing points of view of the original image (e.g., see the sets of frames shown in FIG. 7 that provide differing POV frames along two axes (X and Y axis frames/images of a base or original image 1632)). The module 1620 may generate a frame matrix 1646 as discussed above to properly map the pixels to provide proper X and Y axis interlacing with or without a motion effect. From the matrix 1646, a bidirectional pixel map or print file 1648 is generated by combining the rows and columns of the matrix 1646 with proper sequencing (with all 3D and/or motion information in both directions such as with squares with the data from the matrix 1646 rather than stripes).

The mapping and imaging module 1620 may generate the print file 1648 based on a variety of imaging/mapping parameters 1650. For example, the lens array design information 1652 including whether the lenses are round or square, the optical pitch 1654, and the LPI 1656 values may be taken as input by the module 1620 to create the print file 1648. Further, the device output resolution 1670 may be used by the module 1620 to create the print file 1648 such as to set the number of frames in the sets 1640 or the like. The parameters 1650 may also include motion parameters 1660 to define how to animate the original image with tilting/rotating of an assembly such as by setting the direction of movement of the icons/symbols and how fast movement occurs (how much rotation needed to achieve a particular motion effect and so on). The parameters 1650 may also include color parameters 1666 such as whether or not icons/symbols change colors with rotation of an assembly with an image printed from file 1648 and what such colors should be in the displayed image.

Once a print file 1648 is created, the imaging workstation 1610 may communicate (in a wired or wireless manner such as over a digital communication network) this file 1648 to a print controller 1680 (e.g., another computer or computing device). The print controller 1682 may use this print file 1648 to fabricate a printing or embossing plate 1682, which can then be used to emboss a surface such as the planar/back side of a lens array with fabrication device 1684. This embossed surface can then be filled with one or more coatings/layers of ink to form a printed image in a lens array/printed image assembly (e.g., an anti-counterfeiting device). The controller 1680 may also use the print file 1648 to provide a digital file 1670 to a color, digital printer 1674 for printing of the dual-axis interlaced image on a surface such as the planar back side of a lens array or on a side of a piece of paper currency or a product label over which a lens array is later applied to provide an anti-counterfeiting device on the currency/label.

Figure 17:
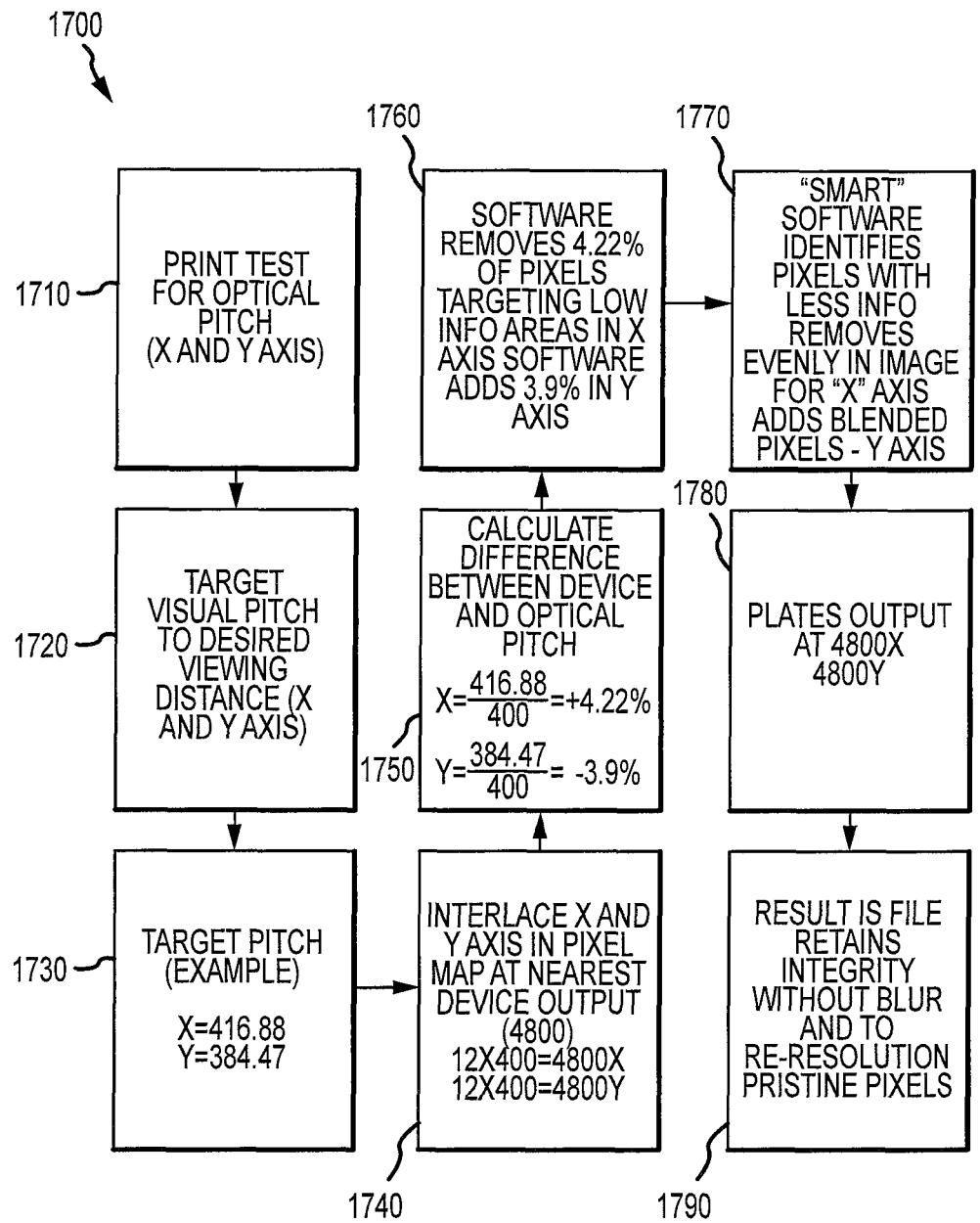
FIG. 17 illustrates a flow diagram of a pixel adjustment method according to the present description and as may be implemented with the system of FIG. 16.

At this point, it may be useful to describe useful techniques for performing pixel adjustment that may be performed (at least in part) by a software module/program such as the mapping and imaging module 1620 of FIG. 16. FIG. 17 illustrates with a flow diagram a pixel adjustment method 1700 according to the present description. The method 1700 includes at 1710 performing a print test (e.g., with components 1680 to 1684 of FIG. 16) to determine the optical pitch, in the X axis and also in the Y axis, of a lens array, which as discussed above, may vary from design. At 1720, a target visual pitch is selected for a desired or input viewing distance (again, in the X and Y axes). For example, as shown at 1730, the method 1700 may involve setting the target pitch at 416.88 for the X axis and 384.47 for the Y axis.

The method 1700 continues at 1740 with interlacing the X and Y axes in the pixel map. This typically involves mapping at the nearest device output for the desired target pitch (e.g., 400 output is near to the pitches set at step 1730). In step 1750, the method 1700 includes calculating the difference between the device output and the target optical pitch. In this example, the difference in the X axis is +4.22 percent (i.e., Target Pitch of 416.88 divided by the device output of 400) and the difference in the Y axis is −3.9 percent (e.g., Target Pitch of 384.47 divided by the device output of 400).

At step 1760, the mapping and imaging module/software program acts to remove pixels based on the differences determined in step 1750. In this example, the module may remove 4.22 percent of the pixels by specifically targeting low information areas in the X axis. The module may also act to add 3.9 percent pixels in the Y axis. Step 1770 of method 1700 further explains this process with the module acting to identify pixels with less information for removal (e.g., evenly in the X axis in this example) while the adding of pixels may be performed by blending pixels (e.g., nearby pixels) (e.g., blending pixels are added in the Y axis). At 1780, plates are output based on the print file modified to provide pixel adjustment. In this working example, the plates for printing may be output at 4800 pixels in the X axis and 4800 pixels in the Y axis. At 1790, it is noted that the process 1700 retains integrity of the displayed image without blur, e.g., due to re-resolution pristine pixels.

Figure 18:
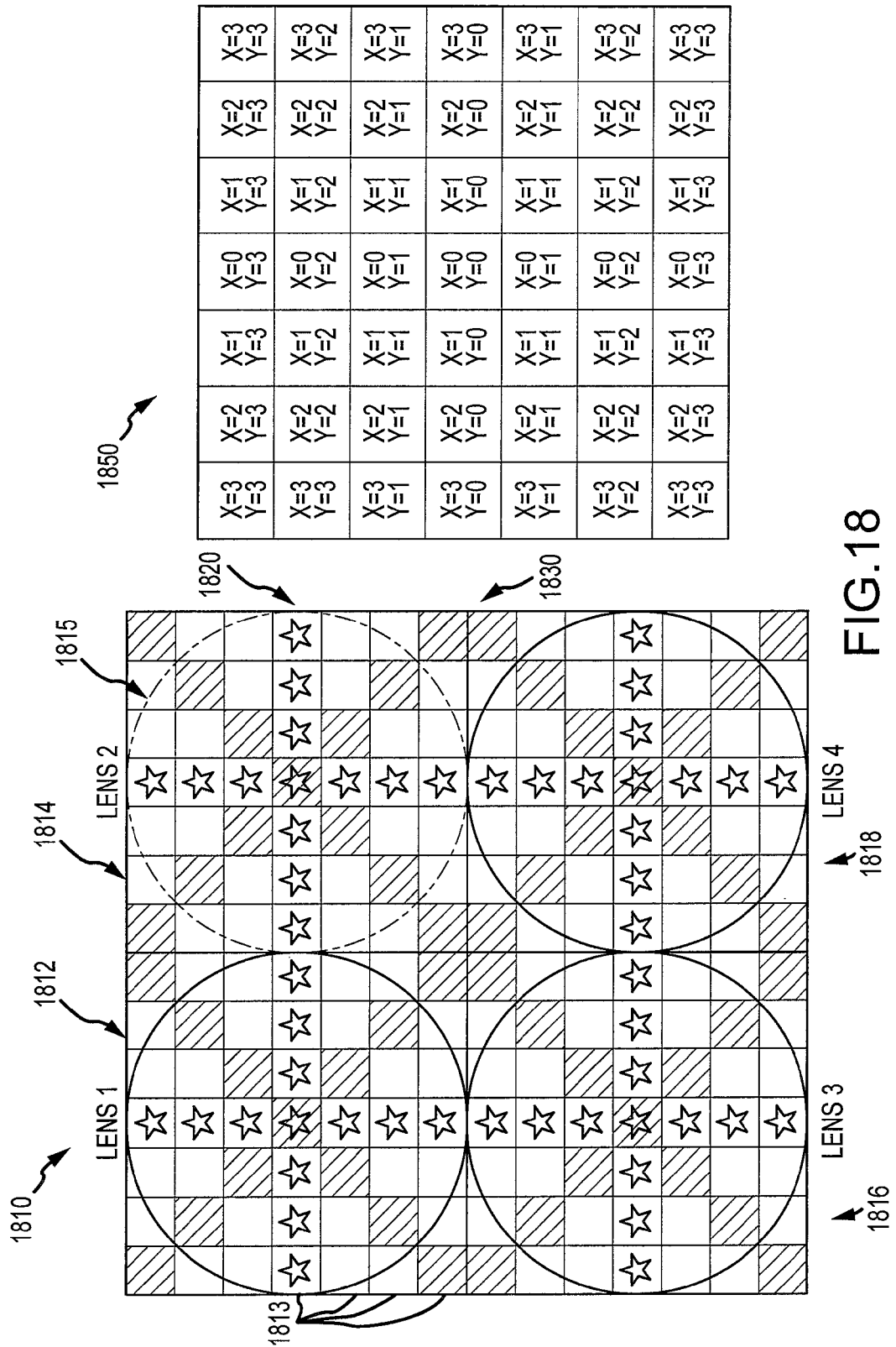
FIG. 18 provides a schematic and a print file (pixel mapping) showing a process of providing dual-axis interlacing of image frames to achieve visual effects described herein.

FIG. 18 is useful for further explaining the process of providing dual-axis interlacing for a lens array of the present description. A small lens array or lenslet 1810 is shown in a plan or top view that includes four lenses 1812, 1814, 1816, and 1818 (with a more typical array having many more lenses). As shown at 1815, the lenses 1812, 1814, 1816, and 1818 are round-based lenses in this non-limiting example. Underneath the lens array 1810, a dual-axis printed image (or ink layer with a printed image) can be provided with each of the boxes 1813 in the figure being used to represent a pixel. Further, each of these "pixels" 1813 can be considered to be a lens focus point.

The printed image provided in pixels 1813 when combined with lens array 1810 provides a display device that can be used to provide full 3D imagery as well as multi-directional motion. For example, each lens 1812, 1814, 1816, 1818 may be used to display a looping image. To this end, the diagonal sets of pixels 1830 shown with shading may be used to provide a 45 degree tilt loop sweep while the horizontal and vertical sets of pixels 1820 shown with "stars" may be used to provide a side-to-side and up-and-down image loop.

With this in mind, graph 1850 is useful for illustrating how an arrangement of 7 pixels by 7 pixels provided under each lens 1812, 1814, 1816, and 1818 may be printed with dual-axis combined/interlaced images to provide these effects. In this example, four frames in the X axis are combined with four frames in the Y axis (e.g., "X=3" refers to a particular frame in the set of four frames along the X axis). A mapping and imaging module (such as module 1620) may be used to select the proper frames to generate such a matrix and/or print map, and a print file can be generated from this mapping for use in printing the dual-axis interlaced images in each pixel as shown in graph 1850 so as to provide the visual effects described with pixels 1820, 1830.

Figure 19:
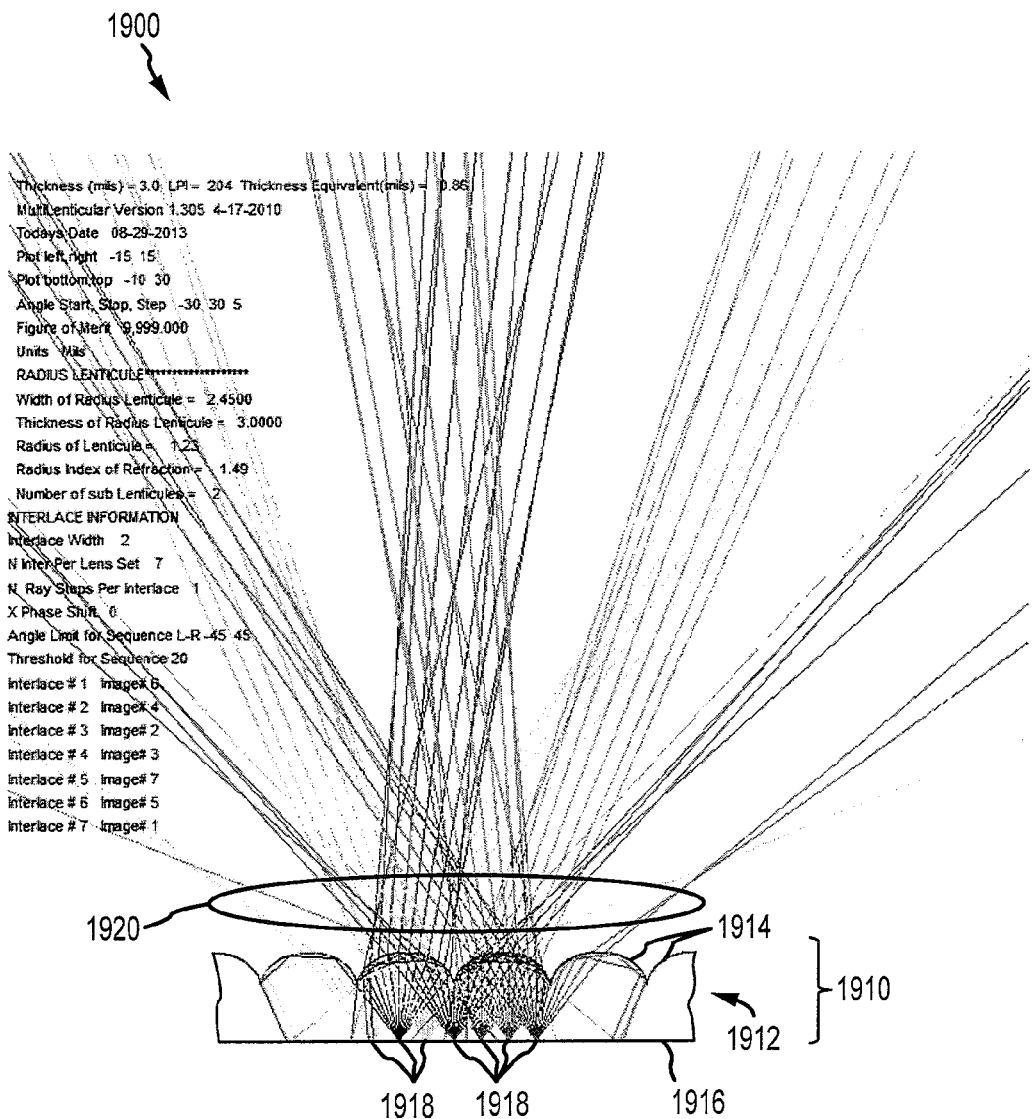
FIGS. 19-21 are plots showing ray tracing for assemblies of the present description, e.g., for a lens array combined with a dual-axis interlaced image.
Figure 20:
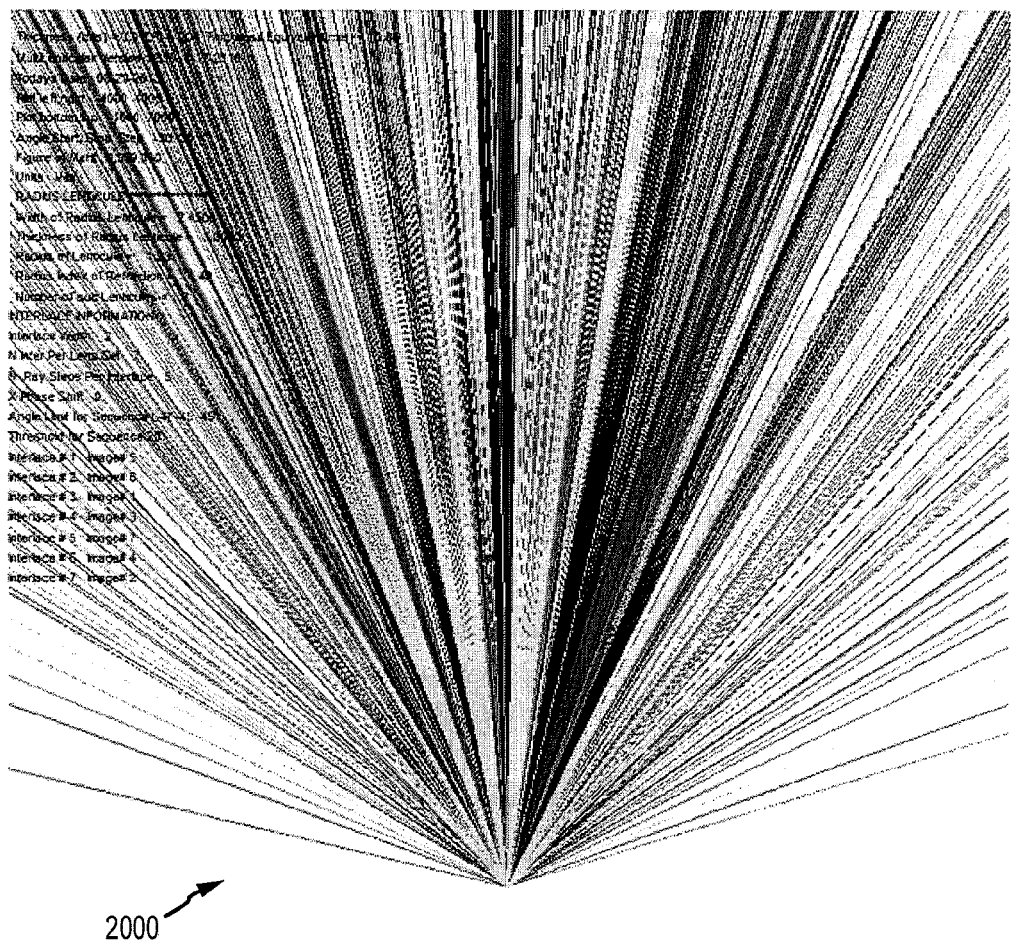
Figure 21:
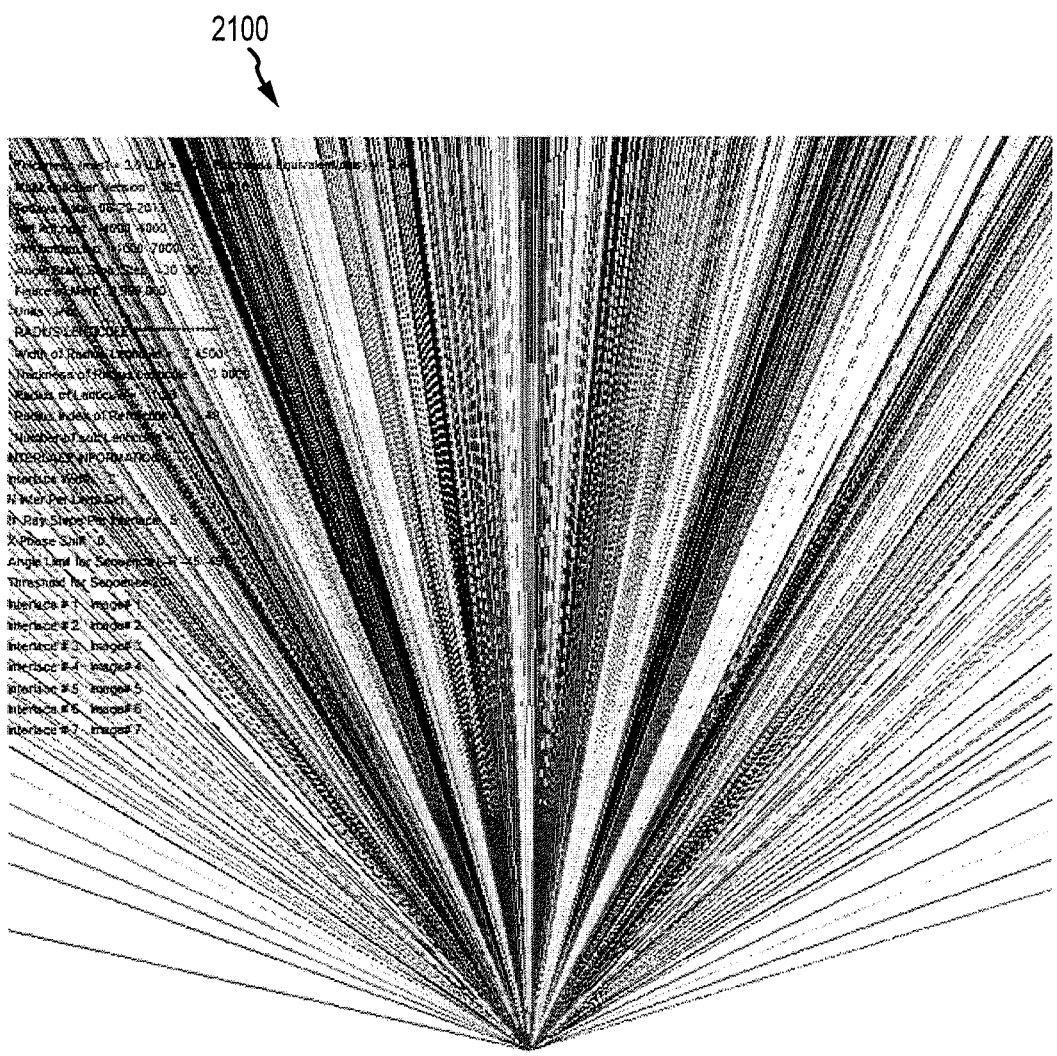

FIGS. 19-21 are plots 1900, 2000, and 2100 showing ray tracing for assemblies of the present description, e.g., for a lens array combined with a dual-axis interlaced image. Particularly, FIG. 19 illustrates a plot 1900 of a tracing of rays 1920 using an assembly 1910 (e.g., an anti-counterfeiting device) configured as described herein. As shown, the assembly 1910 includes a lens array 1912 of round-based lenses 1914 overlying an ink layer/printed image 1916 including a number of interlaces 1918 (7 images are interlaced using dual-axis interlacing).

The plot 1900 shows rays 1920 traced from idealized lenticular interlaced stripes 1918 in printed image/ink layer 1916. The order of the interlaces was modified so that to the viewer the image is properly interlaced. In this example, the radius of each lens 1914 was 1.23 mils, the lenses 1914 were provided at 408 LPI, the lenses 1914 were 3 mils thick, and the index of refraction was assumed to be 1.49. For clarity, only zero width interlaces were represented with 7 interlaces 1918 per sets of two lenses 1914. Tracings were made over a range of +30 degrees to −30 degrees with 5 degree steps showing the near lenticule region.

The plot 2000 is a filled-in ray trace showing a larger overall view of the plot 1900 of FIG. 19. The interlaces for plot 2000 were taken to be 2 mils wide with 7 interlaces provided per set of two lenses. Five steps per interlace were traced, the range was +30 degrees to −30 degrees using 1 degree steps. The sequence of the interlaces was 6, 4, 2, 3, 7, 5, and 1. The plot 2100 is a trace done with a normal sequence of the interlaces (e.g., 1, 2, 3, 4, 5, 6, and 7) for a lens of radius 1.23 mils, lenses provided at 408 LPI, a lens thickness of 3 mils, and an index of refraction of 1.49. The lens width was taken at 2 mils, and there were 7 interlaces provided for each set of two lenses. Five steps were traced across each lens again with a range of +30 degrees to −30 degrees with 1 degree steps. In summary, the plots 1900, 2000, and 2100 show coding that is done by having multiple interlaces per multiple lenticules and the change in distribution to the viewer by changing the interlace sequence.

Figure 22:
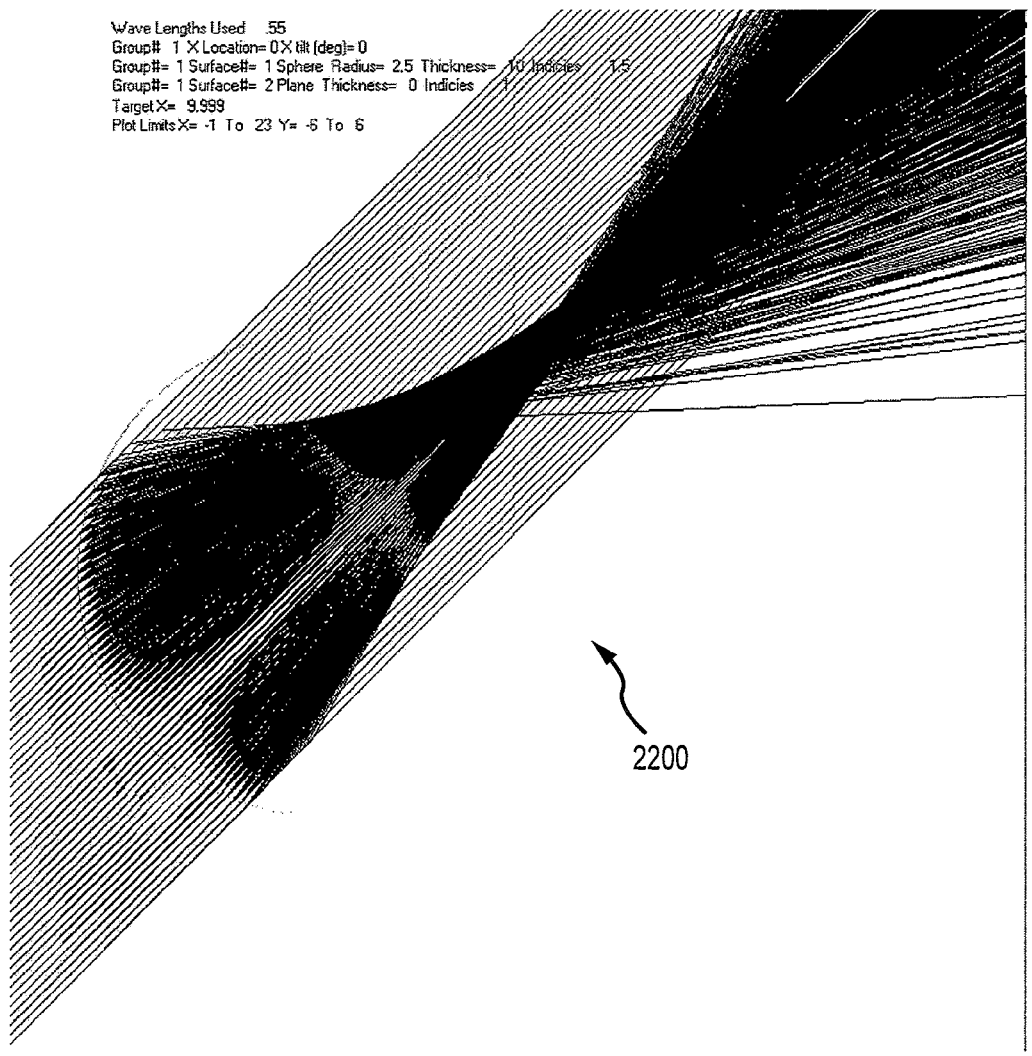
FIG. 22 is plot of an off-axis ray tracing.
Figure 23:
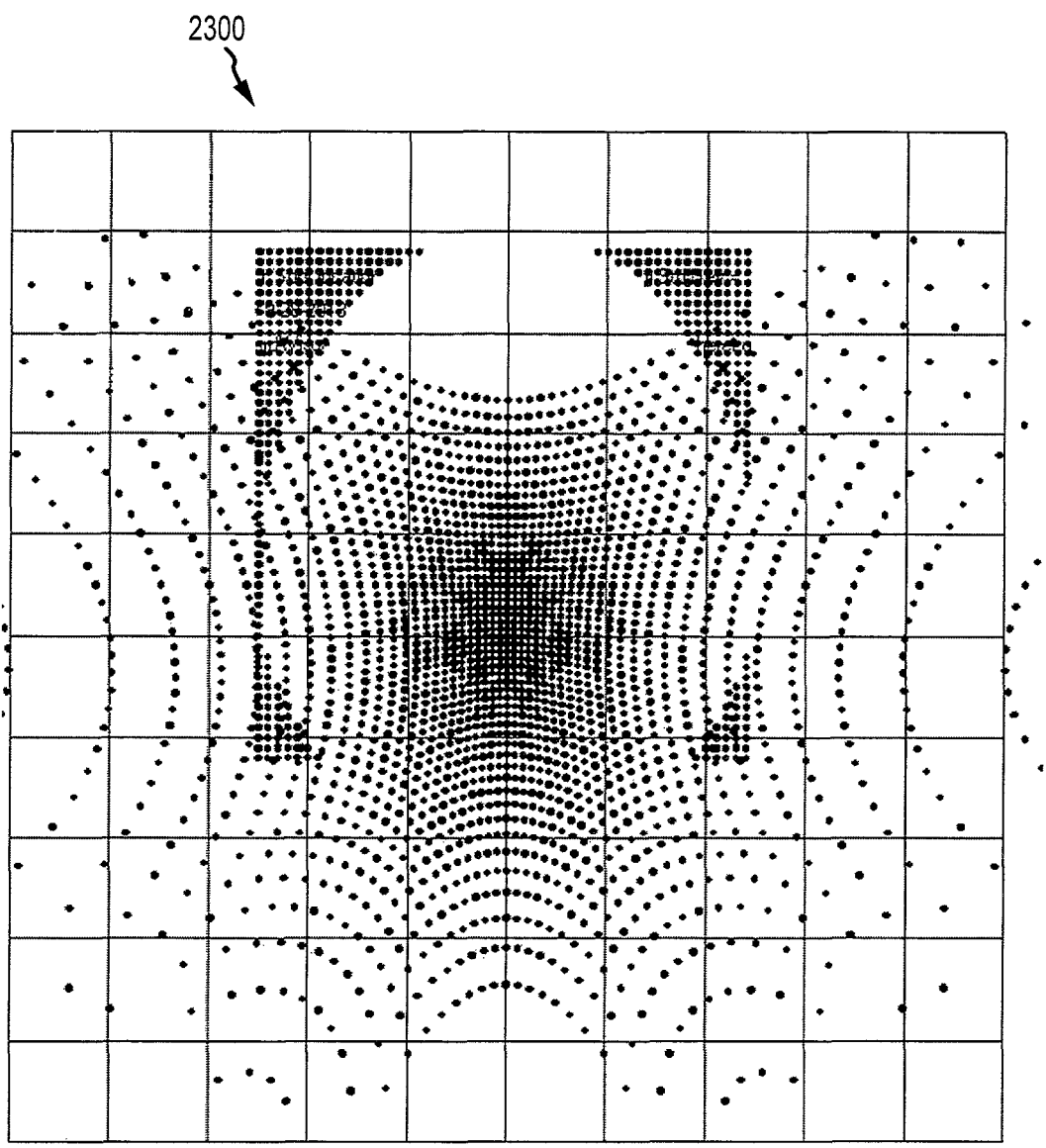
FIG. 23 is a spot diagram corresponding to an off-axis analysis of FIG. 22.
Figure 24:
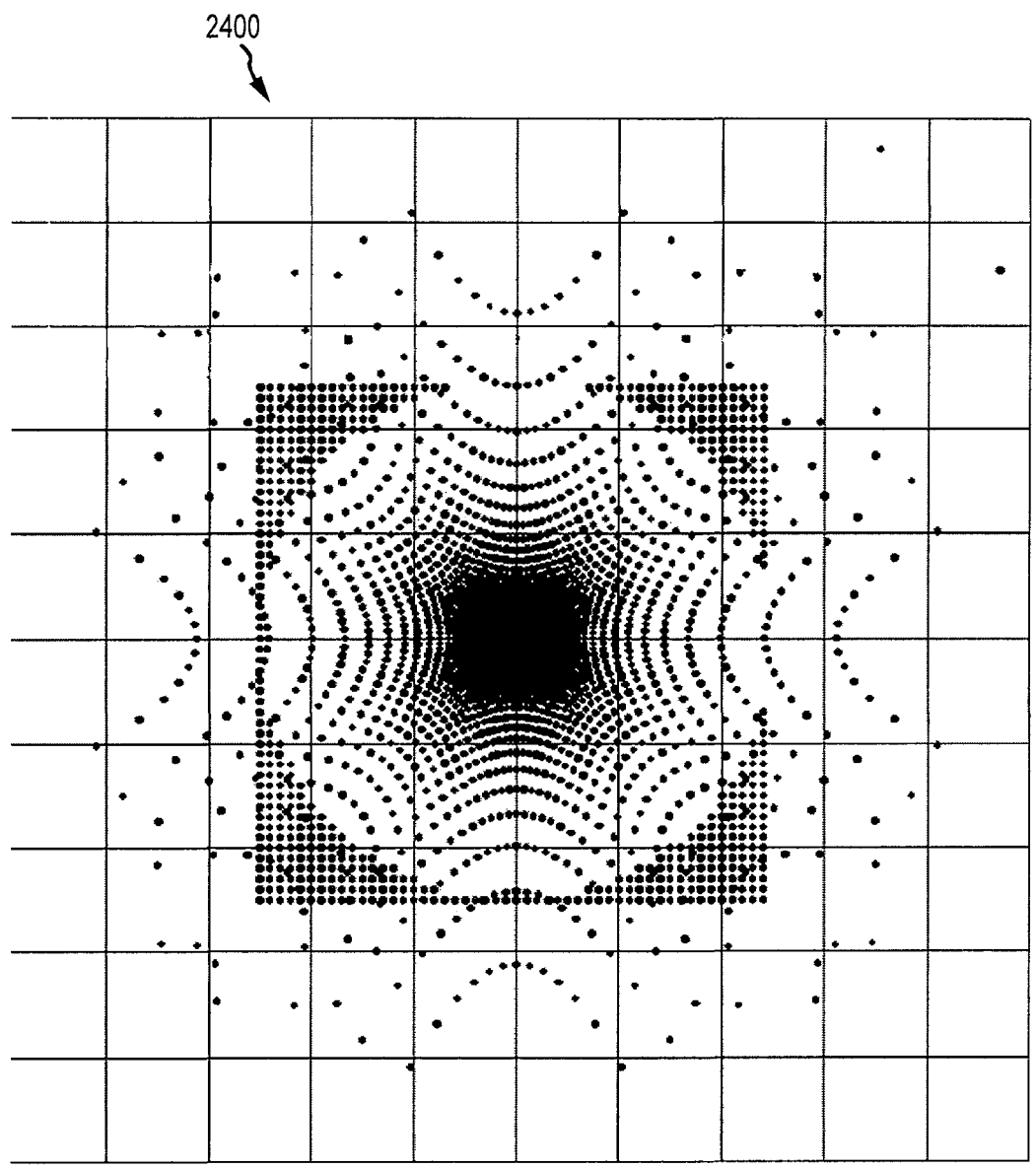
FIGS. 24 and 25 are two additional spot plots or diagrams for a round-based lens (or spherical lens)
Figure 25:
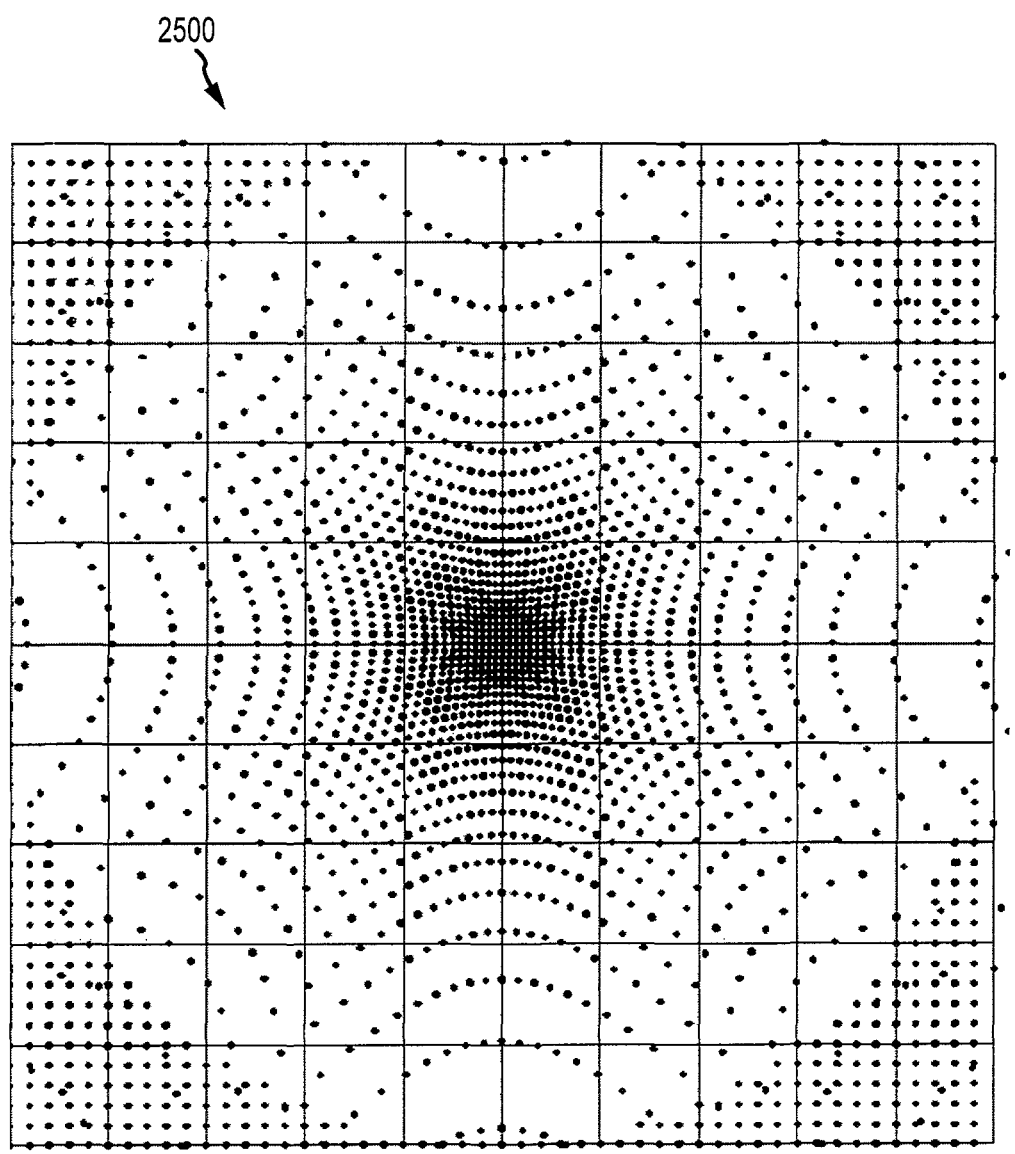
Figure 26:
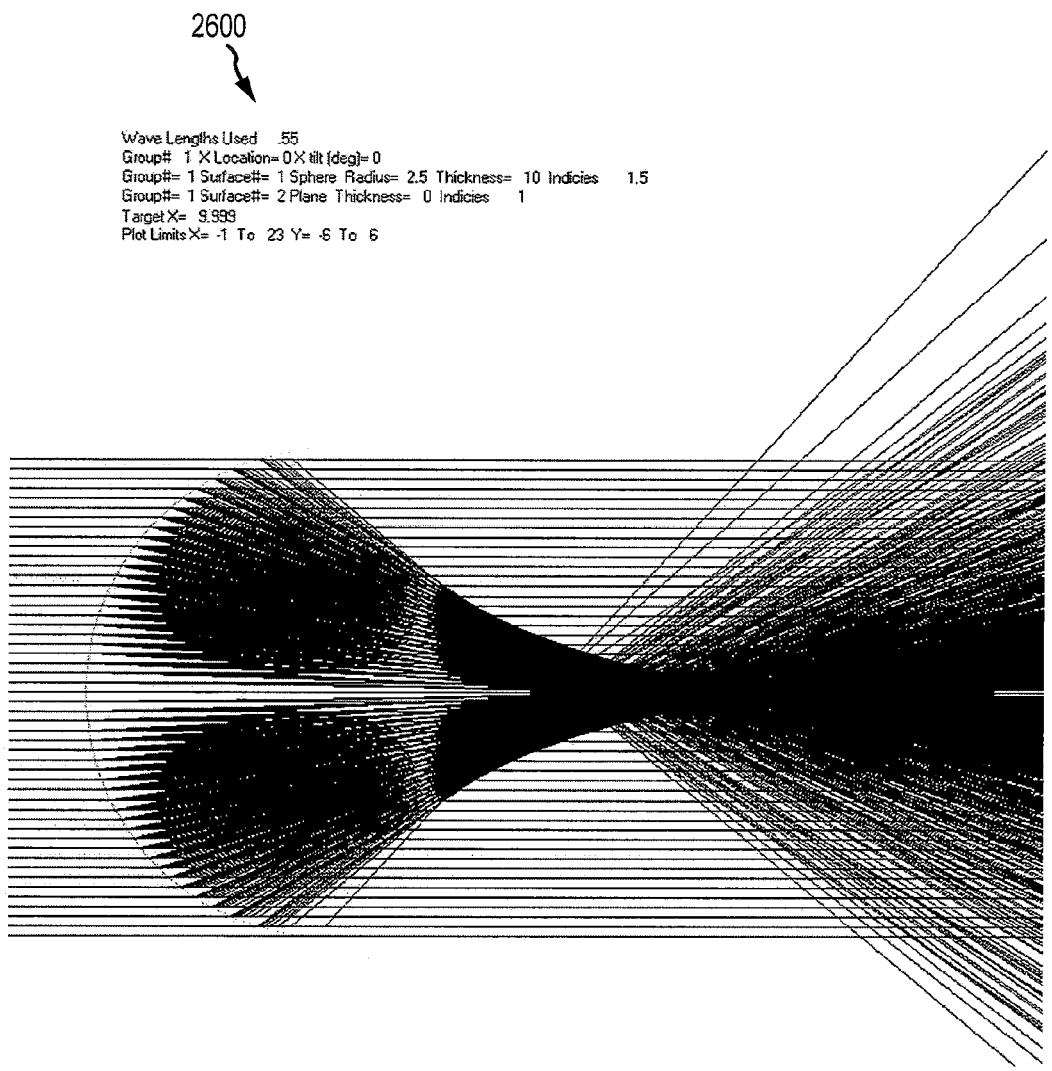
FIG. 26 is a plot of a ray tracing for the lens associated with the plots of FIGS. 24 and 25.

In analyzing use of the lens arrays of the present invention with dual-axis interlaced print images, it is useful to generate ray tracings and spot diagrams to check a planned array/image design. In this regard, FIG. 22 is a plot 2200 of an off-axis ray tracing while FIG. 23 is a corresponding spot diagram 2300 that may be generated to analyze a planned array/image design. Further, FIGS. 24 and 25 are two additional spot plots or diagrams 2400 and 2500 for a round-based lens (or spherical lens), while FIG. 26 is a plot 2600 of a ray tracing for the lens associated with the plots of FIGS. 24 and 25. The radius of the lens for these latter three figures was 5 units and the focal plane was about 10 units (e.g., the units may be any unit such as mils).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The description teaches a display assembly (e.g., an anti-counterfeiting device) that includes an array of round or square lenses combined with an ink layer with a printed image/pattern. The lens arrays are made up of nested round or square lenses arranged as shown in FIGS. 3A-4B. The printed image/pattern provided in the ink layer (or layers) are aligned with the lens arrays (e.g., with the X and Y axes of the printed image), and the printed image/pattern is made up of vertically and horizontally mapped pixels (e.g., printed using a print file defining dual-axis interlacing (or interlacing in two axis) of frames of a matrix as discussed herein). The pixels may be of any type and often are adapted to match the output device with the viewer's optical pitch in two axes. The lens arrays may be provided at 200 or more LPI in both directions so as to provide 4000 lenses or more per square inch. The focal lengths of the lenses may vary, but some arrays have been implemented that have focal lengths of less than about 10/1000 inches for round and for square-based lenses.

The printing of the dual-axis interlaced image for use with a lens array may be performed using one or more colors using the pixel mapping provided in a generated print file. In some cases, diffractive techniques are used to create color with the separation of wave lengths, purposefully or accidentally, within the interlaced image in a round-based lens array. Particularly, the printing step involves printing of an X and Y pixel-imaged file or pixel map so as to produce a printing plate or a digital image, either of which may be used to provide an ink layer with a printed image/pattern that is useful in combination with the round and square-based lenses as nested in an array as described herein (e.g., printing on the back or planar surface of the lens material to provide the X and Y axis pixel mapped images). In other cases, an embossing plate is produced for use to emboss the back of the lens material (lens array). Then, the embossed back surface is filled with ink or metalized for use in holography in combination with a round or square-based lens array. In some cases, though, printing may also occur on the front or contoured surface of the lens array. For example, the printing may involve printing features, colors, or images directly on top of the lenses (i.e., the non-planar side of the lens array) in combination within printing on the back or planar side of the lenses using interlaced images.

A number of unique visual or display effects can be achieved with the printed image viewed through one of the lens arrays of the present description. For example, image mapping of the X and Y axes may be performed so that a wallpapered array of repeating icons (e.g., the company logos and padlocks of the exemplary figures) scroll or move across the substrate in opposite directions to each other when the substrate (or assembly or anti-counterfeiting device) is tilted left and right (rotated about a vertical or first axis) and in the same direction when the substrate is tilted up and down (rotated about a horizontal or second axis transverse to the first axis). This effect may be called "Continuum Movement in Opposite Directions."

In other cases, the image mapping is performed so that a wallpapered array of repeating icons moves or scrolls up and down across the surface of the assembly/anti-counterfeiting device when the assembly/device is tilted left and right (icons all move in the same direction) and left and right when the assembly/device is tilted up and down (again, all icons move in the same direction) (e.g., tilt left causes all icons to scroll or move upward, tilt right causes all icons to scroll move down, tilt up causes all icons to scroll right, and tilt down causes all icons to scroll left). This effect may be labeled "Continuum Movement in Orthogonal Directions."

Image mapping of the X axis and Y axis pixels may be performed such as when a volumetric icon or image like a company logo or a symbol has five viewable sides (e.g., a top side, a bottom side, a left side, a right side, and a face or front side). These five sides are viewable in three dimensions, with apparent depth and in full parallax, when the assembly/device is tilted or rotated in differing directs (orthogonal/normal view, tilt left, tilt right, tilt upward, and tilt downward or a positioning therebetween). The face of the 3D logo/symbol/icon may be a different color than the sides to create a more noticeable 3D effect, and this effect may be called "full volume 3D."

Another effect that can be achieved via the image mapping of the X axis and the Y axis described herein is to provide wallpaper with icons with another overlay pattern. Then, the overlay pattern may be provided in the print file and resulting printed image so that it is hidden from view when the assembly is viewed from certain POVs (such as a normal POV) but gradually becomes more and more visible (in the plane of the film and wallpaper pattern) on top of the icons/symbols/logos of the wallpaper (such as when moved to angles of 30 to 60 degrees or the like from normal). Further, it is not required that the entire printed image provide a single effect. Instead, different zones or portions of the printed image may be used to provide differing visual effects (e.g., any of the effects described herein).

Several means are available to implement the systems and methods discussed in this specification. These means include, but are not limited to, digital computer systems, microprocessors, application-specific integrated circuits (ASIC), general purpose computers, programmable controllers and field programmable gate arrays (FPGAs), all of which may be generically referred to herein as "processors." For example, in one embodiment, signal processing may be incorporated by an FPGA or an ASIC, or alternatively by an embedded or discrete processor. Therefore, other embodiments include program instructions resident on computer readable media which when implemented by such means enable them to implement various embodiments. Computer readable media include any form of a non-transient physical computer memory device. Examples of such a physical computer memory device include, but are not limited to, punch cards, magnetic disks or tapes, optical data storage systems, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to, computer-executable instructions executed by computer system processors and hardware description languages such as Very High Speed Integrated Circuit (VHSIC) Hardware Description Language (VHDL).

We claim:

1. A visual display assembly useful as an anti-counterfeiting device, comprising:
   a film of transparent material comprising a first surface including an array of lenses and a second surface opposite the first surface; and
   a printed image proximate to the second surface, the printed image comprising pixels of frames of one or more images interlaced relative to two orthogonal axes,
   wherein the printed image is adapted such that an image displayed from a normal POV includes a first set of symbols and a second set of symbols,
   wherein in an image displayed when the assembly is rotated from the normal POV about a first axis the first and second sets of symbols move in opposite directions,
   wherein the frames each comprises a different point of view (POV) of the one or more images,
   wherein the frames comprise frames providing at least three POVs along a first of the two orthogonal axes, and
   wherein the frames further comprise at least two additional POVs corresponding to each of the three POVs along the second of the two orthogonal axes.

2. The assembly of claim 1, wherein the printed image is adapted such that in an image displayed, when the assembly is rotated from the normal POV about a second axis orthogonal to the first axis, the first and second symbols move in a single direction that is orthogonal to the second axis.

3. A visual display assembly useful as an anti-counterfeiting device, comprising:
   a film of transparent material comprising a first surface including an array of lenses and a second surface opposite the first surface; and
   a printed image proximate to the second surface, the printed image comprising pixels of frames of one or more images interlaced relative to two orthogonal axes,
   wherein the printed image is adapted such that an image displayed from a normal POV includes a first set of symbols and a second set of symbols and wherein in an image displayed when the assembly is rotated from the normal POV about a first axis the first and second sets of symbols move in a single direction that is parallel to the first axis of the assembly.

4. The assembly of claim 3, wherein the printed image is adapted such that in an image displayed, when the assembly is rotated from the normal POV about a second axis orthogonal to the first axis, the first and second symbols move in a single direction that is parallel to the second axis.

5. A visual display assembly useful as an anti-counterfeiting device on paper currency and product labels, comprising:
   a film of transparent material comprising a first surface including an array of lenses and a second surface opposite the first surface; and
   a printed image proximate to the second surface, the printed image comprising pixels of frames of one or more images interlaced relative to two orthogonal axes,
   wherein the printed image includes a wallpaper pattern and an overlay pattern and wherein the wallpaper pattern is visible from a plurality of POVs and the overlay pattern has a range of differing visibilities over the plurality of POVs.

6. A method of fabricating an anti-counterfeiting device, comprising:
   generating a print file defining dual-axis interlacing of a matrix of image frames;
   providing a transparent film comprising an array of lenses on a first surface; and
   based on the print file, placing an ink layer on a second surface opposite the first surface, wherein the lenses of the array are round or square-based lenses that are nested in the array so as to be aligned in parallel rows and parallel columns,
   wherein the generating of the print file comprises providing interlaced images that when viewed through the array of lenses provide first and second image elements that move in different directions relative to each other when the anti-counterfeiting device is rotated about a first axis.

7. The method of claim 6, wherein the first and second image elements move in like directions relative to each other when the anti-counterfeiting device is rotated about a second axis orthogonal to the first axis.

8. A method of fabricating an anti-counterfeiting device, comprising:
   generating a print file defining dual-axis interlacing of a matrix of image frames;
   providing a transparent film comprising an array of lenses on a first surface; and
   based on the print file, placing an ink layer on a second surface opposite the first surface, wherein the lenses of the array are round or square-based lenses that are nested in the array so as to be aligned in parallel rows and parallel columns,
   wherein the generating of the print file comprises providing interlaced images that when viewed through the array of lenses provide first and second image elements that move in matching directions relative to each other when the anti-counterfeiting device is rotated about a first axis, the matching directions being parallel to the first axis.

9. The method of claim 8, wherein the first and second image elements move in second matching directions relative to each other when the anti-counterfeiting device is rotated about a second axis orthogonal to the first axis, the matching directions being parallel to the second axis.

* * * * *